US012200129B2

(12) United States Patent
Watson et al.

(10) Patent No.: US 12,200,129 B2
(45) Date of Patent: Jan. 14, 2025

(54) ZERO-KNOWLEDGE INTERACTION PROCESSING SYSTEM AND METHOD

(71) Applicant: Visa International Service Association, San Francisco, CA (US)

(72) Inventors: Gaven James Watson, Palo Alto, CA (US); Kim Wagner, Sunnyvale, CA (US); Saikrishna Badrinarayanan, Fremont, CA (US); Srinivasan Raghuraman, New York, NY (US)

(73) Assignee: Visa International Service Association, San Francisco, CA (US)

( * ) Notice: Subject to any disclaimer, the term of this patent is extended or adjusted under 35 U.S.C. 154(b) by 359 days.

(21) Appl. No.: 17/560,701

(22) Filed: Dec. 23, 2021

(65) Prior Publication Data

US 2023/0208643 A1    Jun. 29, 2023

(51) Int. Cl.
*H04L 9/32*    (2006.01)

(52) U.S. Cl.
CPC .......... *H04L 9/3218* (2013.01); *H04L 9/3247* (2013.01)

(58) Field of Classification Search
CPC . H04L 9/3218; H04L 9/3247; H04L 2209/56; H04L 9/40; H04L 63/0407; H04L 63/126; H04L 2209/42
USPC ........................................................ 713/176
See application file for complete search history.

(56) References Cited

U.S. PATENT DOCUMENTS

| 11,227,279 | B2* | 1/2022 | Chen ................. G06Q 20/351 |
| 11,928,686 | B2* | 3/2024 | Germain .............. G06Q 20/385 |
| 2019/0251554 | A1* | 8/2019 | Ma ........................ H04L 9/0869 |
| 2020/0294045 | A1* | 9/2020 | Howard ............. G06Q 30/0617 |

(Continued)

FOREIGN PATENT DOCUMENTS

| CN | 104717067 | 6/2015 |
| WO | 2019/109003 A1 | 6/2019 |

OTHER PUBLICATIONS

A new authentication protocol for an Authentication-as-a-Service (AaaS) cloud using Pedersen commitment scheme, Ibrahim et al, Mar. 2024 (Year: 2024).*

(Continued)

*Primary Examiner* — Jahangir Kabir
(74) *Attorney, Agent, or Firm* — Kilpatrick Townsend & Stockton LLP

(57) ABSTRACT

A user device generates an initiate interaction request message comprising a state commitment. The user device provides the initiate interaction request message to a first server computer, which creates a verify state request message comprising an interaction index, an interaction index commitment, and a first commitment signature formed from the state commitment and the interaction index commitment. The user device receives the verify state request message, then generates a modified verify state request message comprising a user device public key, the state commitment, the interaction index commitment, and the first commitment signature. The user device provides the modified verify state request message to a second server computer. The second (Continued)

server computer verifies the state commitment, verifies the first commitment signature, and creates a second commitment signature formed from the state commitment and the interaction index commitment. The user device receives a verify state response message comprising the second commitment signature.

20 Claims, 9 Drawing Sheets

(56) References Cited

U.S. PATENT DOCUMENTS

2020/0342452 A1    10/2020    Diamond
2021/0357915 A1*  11/2021    Makrides ........... G06Q 20/3674

OTHER PUBLICATIONS

I. Miers, "Decentralized Anonymous Payments", Baltimore, MD, Aug. 2017, 223 pages.
J. Groth et al., "Perfect Non-Interactive Zero Knowledge for NP", Los Angeles, CA, Eurocrypt 2006, 20 pages.

* cited by examiner

ZERO-KNOWLEDGE INTERACTION PROCESSING SYSTEM AND METHOD

CROSS-REFERENCES TO RELATED APPLICATIONS

None.

BACKGROUND

Users perform interactions with one another to provide interaction amounts from one user to another. The interactions are performed using user devices. An interaction can be, for example, a debit based interaction.

As an example, in a standard debit transactions framework, users are required to register with a central server. The central server tracks a list of all users along with their balances. For example, the central server stores information noting that a first user, Alice, has a balance of 500, whereas a second user, Bob, has a balance of 100. Users submit transactions, which move funds from one user to another, to the central server. The central server validates the identities of the parties involved (e.g., of the first user Alice and the second user Bob), and confirms that the payer (which is an example of a sender) has enough funds (i.e., a sufficient balance) to pay the payee (which is an example of a receiver). After validating the identities of the parties and confirming that there are sufficient funds for the funds transfer, the server computer moves the funds by altering the balance associated with the payer to the balance associated with the payee.

Such current methods do not allow the users to remain anonymous to the central server, since the central server needs to verify their identities for every interaction that is performed. Additionally, these methods do not allow the user account balances to remain anonymous, since the central server needs to verify the account balance for every interaction that is performed.

Furthermore, current methods are vulnerable to data breaches, since all of the user identification and balance information is stored by the central server. During a data breach, all of this data can be made readily available by a malicious party.

Embodiments of the disclosure address this problem and other problems individually and collectively.

SUMMARY

One embodiment is related to a method comprising: generating, by a user device, an initiate interaction request message comprising a state commitment; providing, by the user device, the initiate interaction request message to a first server computer, wherein the first server computer creates a verify state request message comprising an interaction index, an interaction index commitment, and a first commitment signature formed from the state commitment and the interaction index commitment; receiving, by the user device, the verify state request message from the first server computer; generating, by the user device, a modified verify state request message comprising a user device public key, the state commitment, the interaction index commitment, and the first commitment signature; providing, by the user device, the modified verify state request message to a second server computer, wherein the second server computer verifies the state commitment, verifies the first commitment signature, and creates a second commitment signature formed from the state commitment and the interaction index commitment; and receiving, by the user device, a verify state response message comprising the second commitment signature from the second server computer.

Another embodiment is related to a user device comprising: a processor; and a computer-readable medium coupled to the processor, the computer-readable medium comprising code executable by the processor for implementing a method comprising: generating an initiate interaction request message comprising a state commitment; providing the initiate interaction request message to a first server computer, wherein the first server computer creates a verify state request message comprising an interaction index, an interaction index commitment, and a first commitment signature formed from the state commitment and the interaction index commitment; receiving the verify state request message from the first server computer; generating a modified verify state request message comprising a user device public key, the state commitment, the interaction index commitment, and the first commitment signature; providing the modified verify state request message to a second server computer, wherein the second server computer verifies the state commitment, verifies the first commitment signature, and creates a second commitment signature formed from the state commitment and the interaction index commitment; and receiving a verify state response message comprising the second commitment signature from the second server computer.

One embodiment is related to a method comprising: receiving, by a first server computer, an initiate interaction request message from a user device, wherein the initiate interaction request message comprises a state commitment, which requests an interaction be processed; determining, by the first server computer, an interaction index for the interaction; generating, by the first server computer, an interaction index commitment based on the interaction index and a random value; generating, by the first server computer, a first commitment signature by signing a combination of the interaction index commitment and the state commitment using a first server computer private key; creating, by the first server computer, a verify state request message comprising the interaction index, the random value, the interaction index commitment, and the first commitment signature; and providing, by the first server computer, the verify state response message to the user device.

Further details regarding embodiments of the disclosure can be found in the Detailed Description and the Figures.

DETAILED DESCRIPTION

Figure 1:
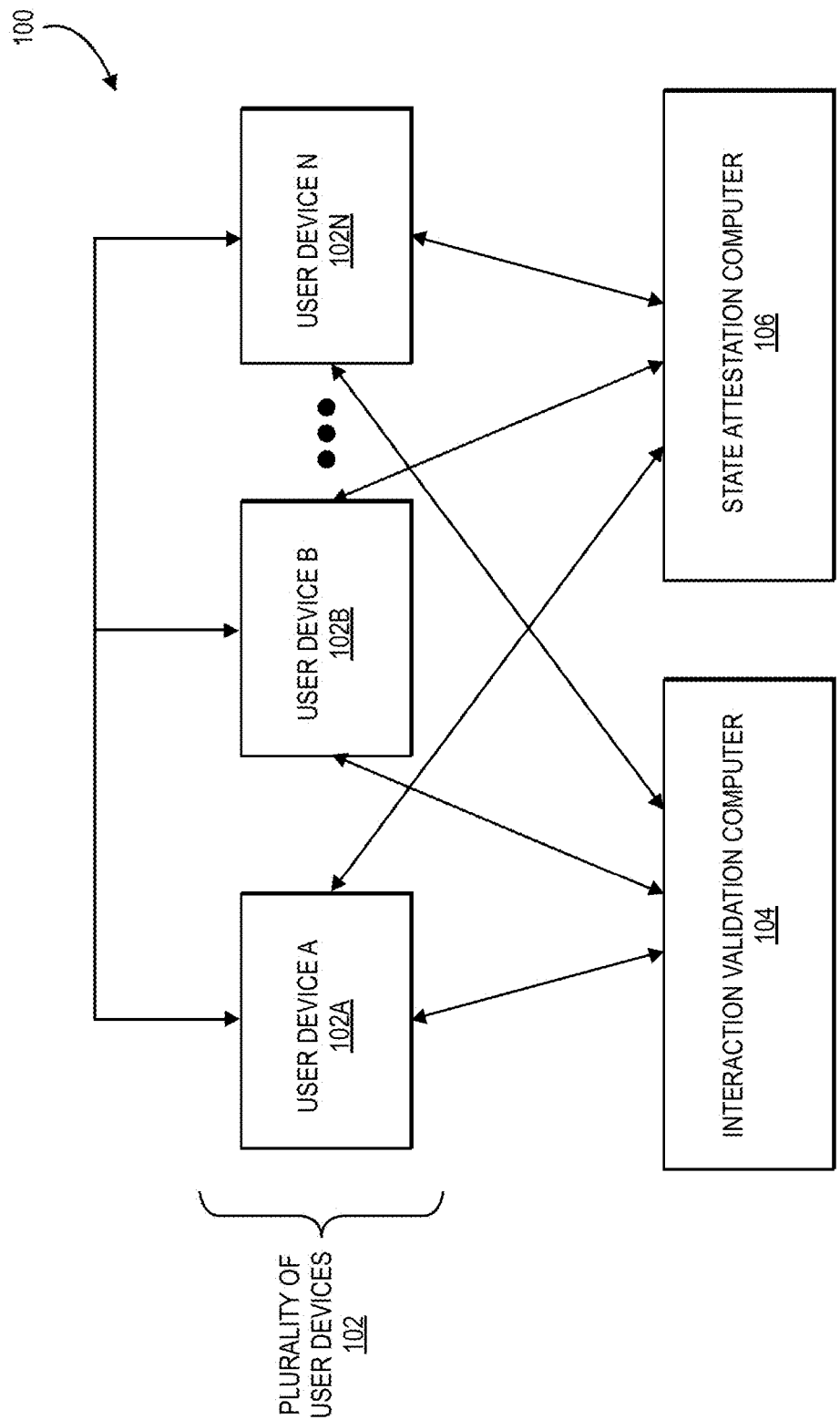
FIG. 1 shows a block diagram of a zero knowledge interaction processing system according to embodiments.

Prior to discussing embodiments of the disclosure, some terms can be described in further detail.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

An "amount" can include a total of a thing or things in number, size, value, or extent. An amount can include a numerical value. An amount can include an amount of data, an amount of money, etc.

A "state" can include a condition that something is in at a specific time. A state can include one or more parameters that represent aspect of a device and/or user. A state can include device public key(s), device serial numbers, one or more device selected random values, one or more signatures (e.g., a signature created by a server computer that indicates enrollment of a device, etc.), and/or any other data that can be utilized to indicate aspects of the device and/or the user of the device at a particular time (e.g., a device identifier, a username, a real name, a birthday, etc.).

A "commitment" can include a selected value that once selected cannot be changed, but can be presented to others. A commitment can be a cryptographically created commitment that allows a device to select a value and commit to that value. A device can commit to any value. For example, a device can commit to a state.

A "commitment process" can include a cryptographic primitive that allows a device to commit to a chosen value (or chosen statement) while keeping it hidden to others, with the ability to reveal the committed value later. Commitment schemes are designed so that a device cannot change the value or statement after having committed to the value. As such, commitment schemes are binding.

An "index" can include a value assigned to a thing in a group of related things. An index can include a numerical value. An index can be assigned to an interaction in a group of interactions. Each interaction can be assigned a different index. An interaction can be looked-up, or otherwise determined, using an index. Each subsequent interaction can be assigned an incrementally higher index value. In some embodiments, an index can be an interaction index.

A "key" or "cryptographic key" can include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "key pair" may include a pair of linked cryptographic keys. For example, a key pair can include a public key and a corresponding private key (which may also be referred to as a secret key). In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public keys and private keys may be in any suitable format, including those based on RSA or elliptic curve cryptography (ECC). In some embodiments, a key pair may be generated using an asymmetric key pair algorithm.

A "digital signature" can include an electronic signature for a message or some data. A digital signature may be a numeric data value, an alphanumeric data value, or any other type of data including a graphical representation. A digital signature may be a unique data value generated from a message and/or data and a private key using an encrypting algorithm. In some embodiments, a validation algorithm employing a public key may be used to verify the signature.

A "zero-knowledge proof" can include a value indicating evidence establishing a fact or the truth of a statement. A zero-knowledge proof can indicate evidence of establishing a fact without disclosing the fact itself. For example, a zero-knowledge proof can include a value indicating evidence of an account balance without disclosing the account balance itself. A zero-knowledge proof can satisfy a completeness property, a soundness property, and a zero-knowledge property. As per the zero-knowledge property, if the zero-knowledge proof is true, then no verifier learns anything other than the fact that the statement is true.

A zero-knowledge proof can be an interactive zero-knowledge proof or a non-interactive zero-knowledge proof. An interactive zero-knowledge proof occurs when a prover must perform an action or series of actions to convince a specific verifier of something. A non-interactive zero-knowledge proof can occur when a provider provides a proof to anyone, where the proof can be verified by anyone that can access the information and attempts to verify the proof. Two example non-interactive zero-knowledge proofs include Zk-SNARK (zero-knowledge succinct non-interactive arguments of knowledge and Zk-STARK (zero-knowledge scalable transparent arguments of knowledge).

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

I. Introduction

Embodiments provide for systems and methods that allow users to maintain their own account balances and anonymously submit interactions to a central authority. The interaction can move amounts from one user to another. The central authority can validate that the interaction submitter (e.g., a payer) has a sufficient account balance and can move the amount, without knowing or learning any account balances, the amounts moved or the identities of the parties involved in the interaction. Rather, the central computer can utilize zero-knowledge proofs that prove that the user is in possession of an amount that covers the interaction transfer amount.

This is in part achieved using a state attestation computer (which may also be referred to as a time-stamper computer) that can verify and sign a state of a user. The aforementioned central computer can be an interaction validation computer that can verify that a particular state is signed by the state attestation computer before authorizing the interaction. In some embodiments, the state of a user device can be defined by a set of information including one or more of the user's public key, serial number, one or more random values, a balance, and an original enrollment signature.

As an example, in a standard debit transactions framework, users are registered with a central server, which tracks the list of users along with their cash balances. Users would submit transactions (that move funds from one user to another) to the central server which would validate the identities of the parties involved, and that the payer has enough funds. The central server would then move the funds.

In contrast, embodiments provide for a system in which users can maintain their own account balances and can anonymously submit interactions to an interaction validation computer denoted by S. The interaction validation computer can validate that the payer has a sufficient account balance and can move the amount without knowing or learning any account balances, the amounts moved or the identities of the parties involved in the interaction. Advantages of embodiments of the invention are discussed in further detail below.

First, users can anonymously perform debit interactions authorized by the interaction validation computer S without the interaction validation computer S having to learn the identities of the users and/or the user devices involved, the balances of the users or the amount of the interaction.

Second, user devices and the interaction validation computer S can interact efficiently. By way of efficiency, embodiments provide this zero-knowledge debit account system to be similar in processing efficiency to a standard debit account system that offers no anonymity nor privacy.

Third, funds cannot be stolen nor created. By way of security, embodiments can ensure that amounts cannot be stolen nor created from nothing.

Note that this must be true even though the interaction validation computer S does not know the end points of an interaction (e.g., the receiver of the interaction amount)nor the amount associated with the interaction.

Fourth, it is possible to perform compliance checks. Although embodiments can ensure complete anonymity and privacy within the scope of normal operation of the zero-knowledge system, embodiments can also be able to perform compliance checks such as KYC (know your customer) checks, velocity and volume checks, audits, etc. Embodiments provide for a mechanism within the zero-knowledge system to enable such compliance checks, which may appear to be at odds with the zero-knowledge aspect of the system, are needed for a fully functional interaction system.

II. Zero-Knowledge Processing System

As described in the above, users of the zero-knowledge system can maintain their own account balances and can anonymously submit interactions to the interaction validation computer S, which can validate the interactions.

As an illustrative example, a first user device can be operated by a first user Alice, denoted by A, while a user device can be operated by a second user Bob, denoted by B. However, it is understood that embodiments can be extended to any number of users.

By way of architecture, several technical problems will be solved. First, users can maintain their own account balances in some form. Let the balances of the first user device A and the second user device B be a first balance $bal_A$ and a second balance $bal_B$ respectively. Note that the first balance $bal_A$ and the second balance $bal_B$ can be changing with time. When interacting with a server, such as the interaction validation computer S, during an interaction, users will not be able to present their balances in the clear. Instead, at a high level (which will be described in detail herein), the users can present an encrypted version of their account balances to the interaction validation computer S. These encrypted balances can be referred to as a state or a user device state (denoted by state). In particular, the states of the first user device A and the second user device B may be a first user device state $state_A$ and a second user device state $state_B$, respectively. Note that the first user device state $state_A$ and the second user device state $state_B$ can change over time.

Consider an interaction between the first user device A and the second user device B. While interacting with the interaction validation computer S, the first user device A and the second user device B are able to remain completely anonymous and private. In particular, this means that the interaction validation computer S is unable to learn anything about the identities and balances of the first user device A and the second user device B from the first user device state state$_A$ and the second user device state state$_B$. The interaction validation computer S is merely able to determine that sufficient balances are available to pay for the interaction amount of the interaction.

Another technical problem solved by embodiments, can relate to "how can the interaction validation computer S be certain that a presented state is the most recent state and not an older state." In particular, embodiments solve the technical problem of rollback attacks on the state. Solutions involving tracking prior states, either in compressed or uncompressed form, would lead to linkability and compromise on anonymity, hence making them undesirable. An alternate approach would be to force parties (e.g., user devices) to keep refreshing states in a synchronized manner at some globally specified time ticks, but this would unnecessarily and artificially overburden the participants of the system (e.g., the user devices and the interaction validation computer S) and the system itself—this is also undesirable. An entirely different approach would be to use secure hardware that would provide guarantees on the freshness of the states it produces. However, by doing so, only devices manufactured with the proper hardware can operate within the system. One technical problem is thus—how to ensure the freshness of the states presented to S.

Another technical problem arises in regards to compliance checks. Note that just as it is possible for the interaction validation computer S to be convinced of sufficient balances for an interaction, it would also be possible for the interaction validation computer S to perform some volume checks. However, it would be much more difficult for the interaction validation computer S to perform any checks involving the identities of the user devices such as velocity checks, audits, etc. Another technical problem is thus—how to enable compliance checks while preserving anonymity and privacy.

In order to address these challenges, embodiments provide for an architecture that involves a computer in addition to the interaction validation computer S that can also participate in the interactions. This computer can be a state attestation computer, denoted by T. The state attestation computer can aid in preventing rollback attacks and can also enable compliance checks that could involve the identities of parties. The first point to note is that user devices will not be entirely anonymous to the state attestation computer T. In particular, the state attestation computer T can track the most recent states of user devices of the system. However, the state attestation computer T will not see any other information related to the interactions themselves. It is the state attestation computer T that will be able to attest to the freshness of the states presented to the interaction validation computer S and to prevent rollbacks on the state.

By design, this also means that the state attestation computer T will be able to perform velocity checks and perform other compliance checks involving the identities of the users as well.

A. System Overview

FIG. 1 shows a system 100 according to embodiments of the disclosure. The system 100 comprises a plurality of user devices 102, an interaction validation computer 104 (which may be an example of a first server computer), and a state attestation computer 106 (which may be an example of a second server computer).

The plurality of user devices 102 includes a user device A 102A, a user device B 102B, and a user device N 102N. Each user device of the plurality of user devices 102 can be in operative communication with the interaction validation computer 104. Each user device of the plurality of user devices 102 can be in operative communication with the state attestation computer 106. Furthermore, each user device of the plurality of user devices 102 can be in operative communication with one or more other user devices of the plurality of user devices 102.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between the devices in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The plurality of user devices 102 can include any number of user devices, such as the user device A 102A, the user device B 102B, and the user device N 102N. The plurality of user devices 102 can include any types of user devices, such as, mobile phones, cards, laptop computers, desktop computers, etc. For example, the user device A 102A can include a laptop computer, the user device B 102B can include a desktop computer, and the user device N 102N can include a mobile phone.

Each user device of the plurality of user devices 102 can enroll in, for example, a zero-knowledge debit account processing system with the interaction validation computer 104.

The interaction validation computer 104 can include a computer or a server computer, for example, that can validate interactions performed by user devices of the plurality of user devices 102. The interaction validation computer 104 can additionally enroll user devices in the system upon request from the user device.

After having been enrolled, each user device of the plurality of user devices 102 can track a state of the user device itself. For example, the state can include a user device public key, a user device identifier (e.g., a serial number), one or more randomly selected values, and a signature attesting to the fact that the user device has been enrolled in the system.

Each user device of the plurality of user devices 102 can communicate with the state attestation computer 106 when attempting to perform an interaction to obtain an indication of verification of the state of the user device.

The state attestation computer 106 can include a computer or a server computer, for example, that can attest to a state of a user device of the plurality of user devices 102. The state attestation computer 106 may track the state of a user device over time as the state is updated. The state attestation computer 106 can generate a signature if the state of the user device is correct, as described in further detail herein.

A user device of the plurality of user devices 102 can receive the signature indicating the correctness of the state from the state attestation computer 106. The user device can then communicate with the interaction validation computer 104 to perform an interaction to provide an amount to a different user device, as described in further detail herein.

The system 100 illustrated in FIG. 1 includes a single interaction validation computer S and a single state attestation computer T. However, the system 100 can be readily extended to allow for multiple interaction validation computers S and multiple state attestation computers T (for multiple state attestation computers T, there can be a shared state to ensure consistency).

In some embodiments, the interaction validation computer 104 and the state attestation computer 106 can be separate devices that do not communicate with one another. By separating the capabilities of the interaction validation computer 104 and the state attestation computer 106, embodiments can provide anonymity to users of the plurality of user devices 102. If the interaction validation computer 104 and the state attestation computer 106 were to be combined in a single device or server computer, or otherwise collude with one another, the anonymity provided by embodiments could be removed. This is because, if the interaction validation computer 104 and the state attestation computer 106 were a single device with all of the data obtained by the interaction validation computer 104 and the state attestation computer 106, then the single device could be able to track the user device states over time as well as link those states to the interactions themselves. For example, since the state of the user device can include a user device public key, the single device could directly link the user device public key to each interaction performed by that user device, thus preventing anonymity.

B. User Device

Figure 2:
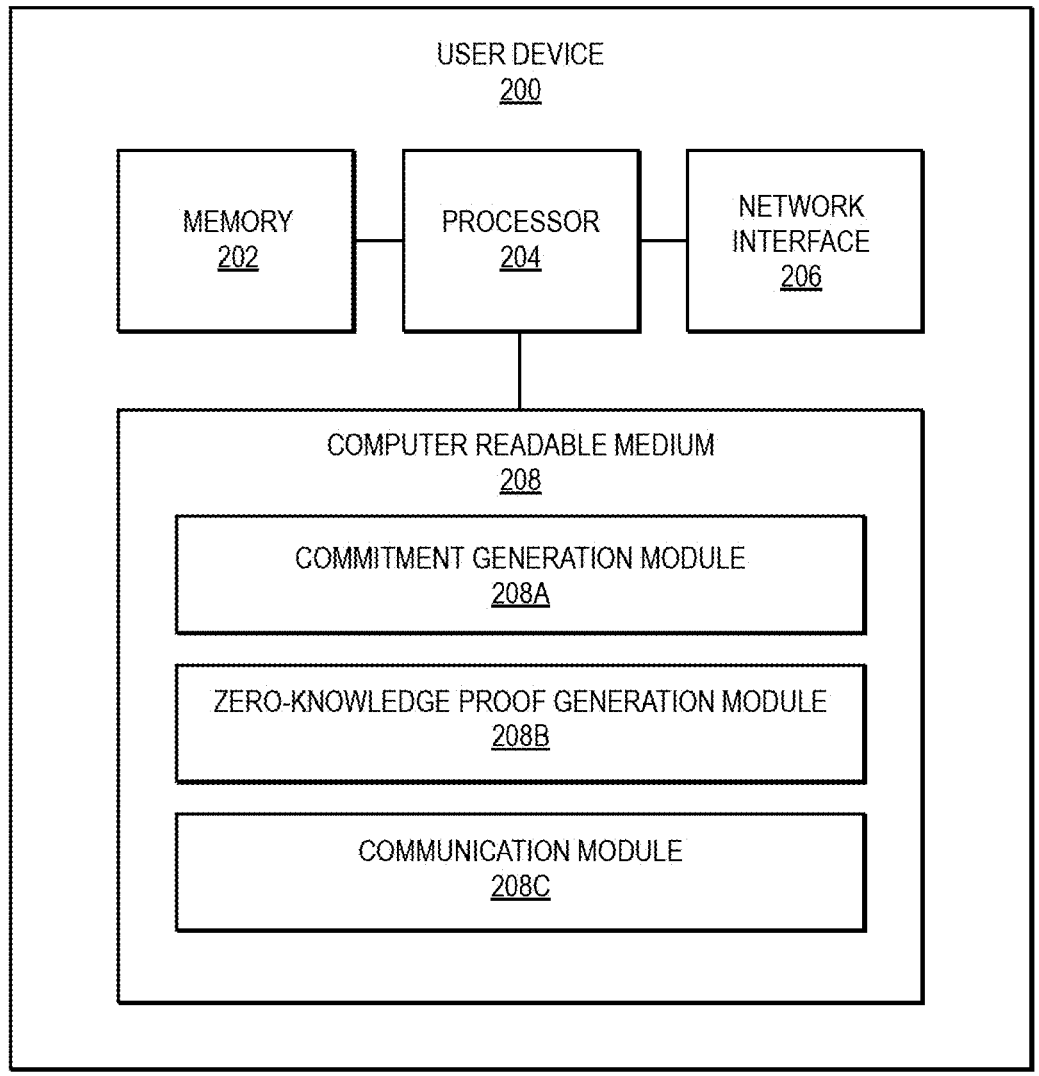
FIG. 2 shows a block diagram of components of a user device according to embodiments.

FIG. 2 shows a block diagram of a user device 200 according to embodiments. The exemplary user device 200 may comprise a processor 204. The processor 204 may be coupled to a memory 202, a network interface 206, and a computer readable medium 208. The computer readable medium 208 can comprise a commitment generation module 208A, a zero-knowledge proof generation module 208B, and a communication module 208C.

The memory 202 can be used to store data and code. For example, the memory 202 can store a user device public key, a user device private key, one or more random values, a user device state, a user device identifier, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: generating, by a user device, an initiate interaction request message comprising a state commitment; providing, by the user device, the initiate interaction request message to a first server computer, wherein the first server computer creates a verify state request message comprising an interaction index, an interaction index commitment, and a first commitment signature formed from the state commitment and the interaction index commitment; receiving, by the user device, the verify state request message from the first server computer; generating, by the user device, a modified verify state request message comprising a user device public key, the state commitment, the interaction index commitment, and the first commitment signature; providing, by the user device, the modified verify state request message to a second server computer, wherein the second server computer verifies the state commitment, verifies the first commitment signature, and creates a second commitment signature formed from the state commitment and the interaction index commitment; and receiving, by the user device, a verify state response message comprising the second commitment signature from the second server computer.

The commitment generation module 208A may comprise code or software, executable by the processor 204, for generating commitments. The commitment generation module 208A, in conjunction with the processor 204, can generate a commitment for any value stored by the user device 200. For example, the commitment generation module 208A, in conjunction with the processor 204, can generate a commitment for a combination of a user device public key and a user device identifier, a commitment for an account balance, a commitment for a user device state, a commitment for an amount (e.g., a transfer amount), a commitment for a combination of the user device public key and an updated user device identifier, a commitment for an updated balance, and any other suitable value for which the user device 200 needs to commit to.

The commitment generation module 208A, in conjunction with the processor 204, can generate a commitment using a random value, where the commitment can be verified using the random value. In some embodiments, the commitment generation module 208A, in conjunction with the processor 204, can generate the commitment using a bit-commitment in a random oracle model method. For example, the commitment generation module 208A, in conjunction with the processor 204, can hash together a message (e.g., a first balance) and a random value. A device can later verify the commitment to the first balance using the first balance and the random value to generate a new hash value and compare the result to the commitment to the first balance. The commitment can be considered valid if the two values match.

In some embodiments, the commitment generation module 208A, in conjunction with the processor 204, can generate a commitment using bit-commitment in the random oracle model, bit-commitment from any one-way permutation, bit-commitment from a pseudo-random generator, and/or any other commitment generation process known to one of skill in the art.

In some embodiments, the commitment generation module 208A, in conjunction with the processor 204, can perform a Pedersen commitment process. For example, the commitment generation module 208A, in conjunction with the processor 204, can determine a secret message m that is be to be kept secret (e.g., an identifier, a balance, etc.). The commitment generation module 208A, in conjunction with the processor 204, can determine, or otherwise obtain, a random value r. The commitment generation module 208A, in conjunction with the processor 204, can then produce a commitment c by applying a public method (e.g., the commitment algorithm C). For example, the commitment generation module 208A, in conjunction with the processor 204, can perform $c=C(m, r)$. The commitment generation module 208A, in conjunction with the processor 204, can make the commitment c public (e.g., is provided to a verifier). The commitment generation module 208A, in conjunction with the processor 204, can further provide the values of the message m and the random value r to the verifier (e.g., an interaction validation computer, a state attestation computer, etc.). The verifier can verify whether or not the commitment algorithm C, when applied to the message m and the random value r, produces the commitment c.

The commitment algorithm C, according to a Pedersen commitment process, can include utilizing a public group (G,) of large order q in which the discrete logarithm is hard, and two random public generators g and h. The random secret r is chosen in a set of q integers, the message m is from any subset of that set. The commitment is then given by $C(m,r)=g^m \cdot h^r$.

The zero-knowledge proof generation module 208B can include code or software, executable by the processor 204, for generating a zero-knowledge proof. The zero-knowledge proof generation module 208B, in conjunction with the processor 204, can generate a zero-knowledge proof for any value that the user device 200 needs to prove to another device, but does not need to disclose the value itself.

The zero-knowledge proof generation module 208B, in conjunction with the processor 204, can generate a zero-knowledge proof for enrollment (an enrollment proof). The zero-knowledge proof generation module 208B, in conjunction with the processor 204, can generate the enrollment proof based on a user device identification commitment, a balance commitment, a user device public key, a balance, a first random value, a second random value, and, in some embodiments, an index.

The enrollment proof can prove that there exists a user device public key, a balance, the first random value, and the second random value, such that 1) the user device identification commitment is valid, 2) the balance commitment is valid, and 3) and the balance has a value greater than or equal to zero.

The zero-knowledge proof generation module 208B, in conjunction with the processor 204, can generate the enrollment proof using a zero-knowledge proof generation process as known to one of skill in the art. For example, the zero-knowledge proof generation module 208B, in conjunction with the processor 204, can implement a Zk-STARK, a Zk-SNARK, or any other available zero-knowledge proof generation process.

As an illustrative example, the zero-knowledge proof generation module 208B, in conjunction with the processor 204, can determine a common reference string (CRS), if not yet created or obtained. The common reference string can be a string that all parties (e.g., the user device 200, the interaction validation computer, the state attestation computer, etc.) utilize and have access to. In some embodiments, the common reference string can include randomly chosen group elements that all parties use. Although the group elements can be random, the common reference string is not itself random because the common reference string contains a certain structure (e.g., group elements) that is distinguishable from randomness. The common reference string can aid in the generation of the non-interactive zero-knowledge proof, as known to one of skill in the art.

The zero-knowledge proof generation module 208B, in conjunction with the processor 204, can implement a prove function, as known to one of skill in the art, that takes an input witness message (that will be provided to the verifier), a statement (that the user device 200 is proving), and the common reference string. The prove function can output a zero-knowledge proof ($\pi$).

The zero-knowledge proof generation module 208B, in conjunction with the processor 204, can generate a zero-knowledge proof for a new state (a state proof). The zero-knowledge proof generation module 208B, in conjunction with the processor 204, can generate the enrollment proof based on an index, a new user device identification commitment, an amount commitment, a previous state commitment, a new balance commitment, a user device public key, a balance, an amount, and a plurality of random values.

The communication module 208C can include code or software, executable by the processor 204, for communicating with other devices. The communication module 208C, in conjunction with the processor 204, can generate messages, reformat messages, and/or otherwise communicate with other devices. For example, the communication module 208C may be configured or programmed to perform some or all of the functionality associated with receiving, sending, and generating electronic messages for transmission to or from any of the entities shown in FIG. 1. When an electronic message is received by the user device 200 via the network interface 206, the message may be passed to the communication module 208C. The communication module 208C, in conjunction with the processor 204, can identify and parse the relevant data based on any messaging protocol used by the sending device.

The network interface 206 may include an interface that can allow the user device 200 to communicate with external computers. The network interface 206 may enable the user device 200 to communicate data to and from another device (e.g., one or more other user devices, a first server computer, a second server computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

C. Interaction Validation Computer

Figure 3:
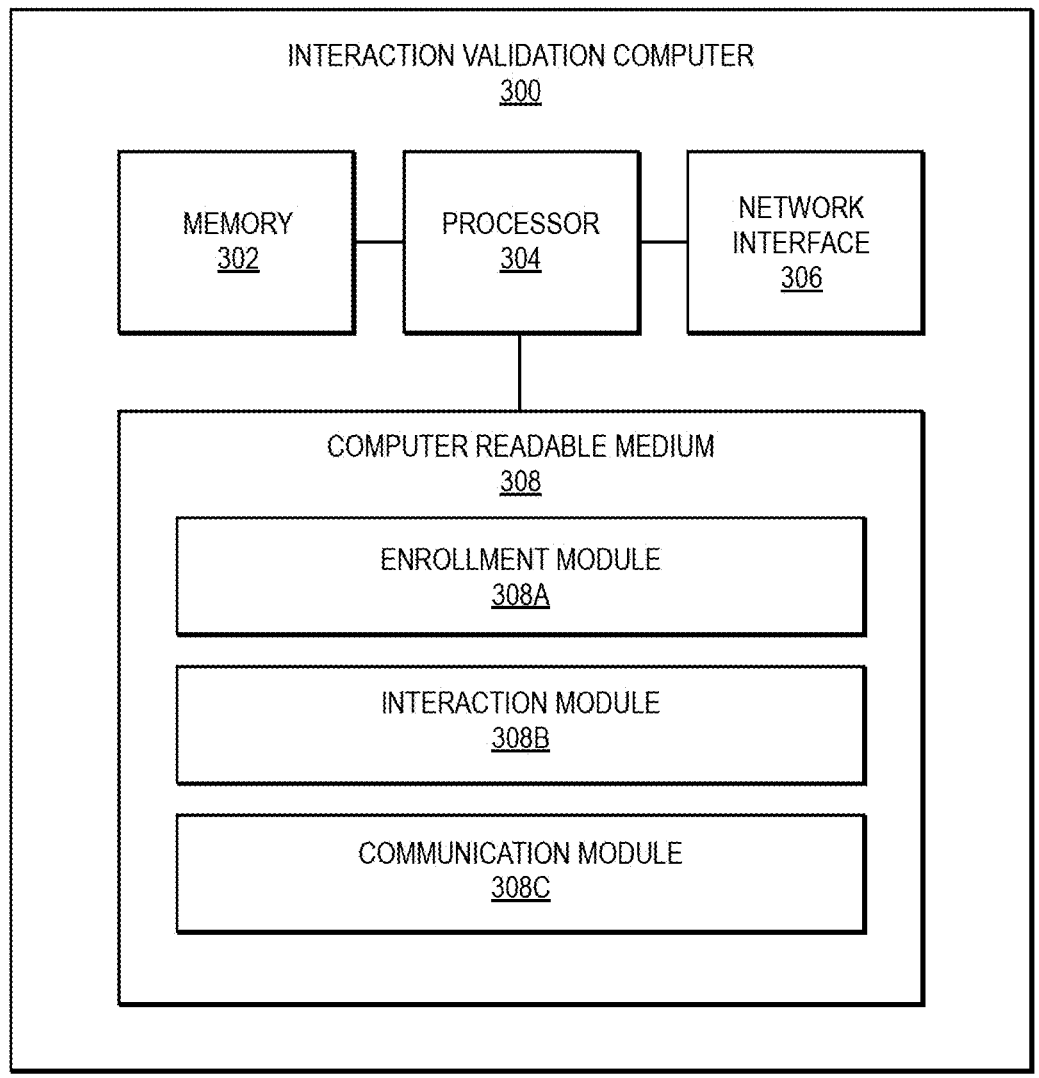
FIG. 3 shows a block diagram of components of an interaction validation computer according to embodiments.

FIG. 3 shows a block diagram of an interaction validation computer 300 according to embodiments. The exemplary interaction validation computer 300 may comprise a processor 304. The processor 304 may be coupled to a memory 302, a network interface 306, and a computer readable medium 308. The computer readable medium 308 can comprise an enrollment module 308A, an interaction module 308B, and a communication module 308C.

The memory 302 can be used to store data and code and may be similar to the memory 202 as described herein. As an example, the memory 302 can store one or more indices, an interaction validation computer public key, an interaction validation computer private key, etc.

The computer readable medium 308 may comprise code, executable by the processor 304, for performing a method comprising: receiving, by a first server computer, an initiate interaction request message from a user device, wherein the initiate interaction request message comprises a state commitment, which requests an interaction be processed; determining, by the first server computer, an interaction index for the interaction; generating, by the first server computer, an interaction index commitment based on the interaction index and a random value; generating, by the first server computer, a first commitment signature by signing a combination of the interaction index commitment and the state commitment using a first server computer private key; creating, by the first server computer, a verify state request message comprising the interaction index, the random value, the interaction index commitment, and the first commitment signature; and providing, by the first server computer, the verify state request message to the user device. The first server computer can be the interaction validation computer 300.

The enrollment module 308A may comprise code or software, executable by the processor 304, for enrolling devices in an interaction processing system. The enrollment module 308A, in conjunction with the processor 304, can enroll a user device into the interaction processing system upon receiving an enrollment request message from the user device. The enrollment request message can include an enrollment proof, an identifier commitment, and a balance commitment. The enrollment module 308A, in conjunction with the processor 304, can verify an enrollment proof that is included in the enrollment request message. The enrollment module 308A, in conjunction with the processor 304, can verify the enrollment proof using a non-interactive zero-knowledge proof verification process.

For example, the enrollment module 308A, in conjunction with the processor 304, can verify the enrollment proof by implementing a zero-knowledge proof verification algorithm, as known to one of skill in the art, that accepts at least the enrollment proof as input. The zero-knowledge proof verification algorithm can output a value of 1 if the enrollment proof is valid and can output a value of 0 if the enrollment proof is not valid.

The enrollment module 308A, in conjunction with the processor 304, can generate a signature indicating the verification of the enrollment proof (e.g., an enrollment verification signature). The enrollment module 308A, in conjunction with the processor 304, can generate a digital signature on a combination of (e.g., a tuple comprising) the identifier commitment and the balance commitment using an interaction validation computer private key.

The interaction module 308B can include may comprise code or software, executable by the processor 304, for validating an interaction attempted by a user device. The interaction module 308B, in conjunction with the processor 304, can receive an interaction request message, from a user device, comprising an index, a random value, a state commitment, an amount commitment, a new identifier commitment, a new balance commitment, a state attestation signature (e.g., created by a state attestation computer), and a state proof.

The interaction module 308B, in conjunction with the processor 304, can verify the state attestation signature using a state attestation computer public key. The interaction module 308B, in conjunction with the processor 304, can verify the state proof. The interaction module 308B, in conjunction with the processor 304, can verify the state proof similar to how the enrollment module 308A, in conjunction with the processor 304 verifies the enrollment proof. For example, the interaction module 308B, in conjunction with the processor 304, can input the state proof into a zero-knowledge proof algorithm. The zero-knowledge proof algorithm can output a value of 1 if the state proof is valid and can output a value of 0 if the state proof is not valid.

If the state attestation signature and the state proof are valid, then the interaction module 308B, in conjunction with the processor 304, can generate a plurality of signatures. The interaction module 308B, in conjunction with the processor 304, can generate an index and amount signature by signing a combination of the index and the amount commitment using an interaction validation computer private key. The interaction module 308B, in conjunction with the processor 304, can generate a new state signature by signing a combination of the new identifier commitment and the new balance commitment using the interaction validation computer private key. The interaction module 308B, in conjunction with the processor 304, can generate a state signature by signing a combination of the state commitment and the new state signature using the interaction validation computer private key.

The communication module 308C can include may comprise code or software, executable by the processor 304, for communicating with other devices. The communication module 308C may have similar characteristics as the communication module 208C of the user device 200 of FIG. 2, and the descriptions are incorporated herein, and need not be repeated here.

The network interface 306 may be similar to the network interface 206 and the description thereof is incorporated herein, and need not be repeated here.

D. State Attestation Computer

Figure 4:
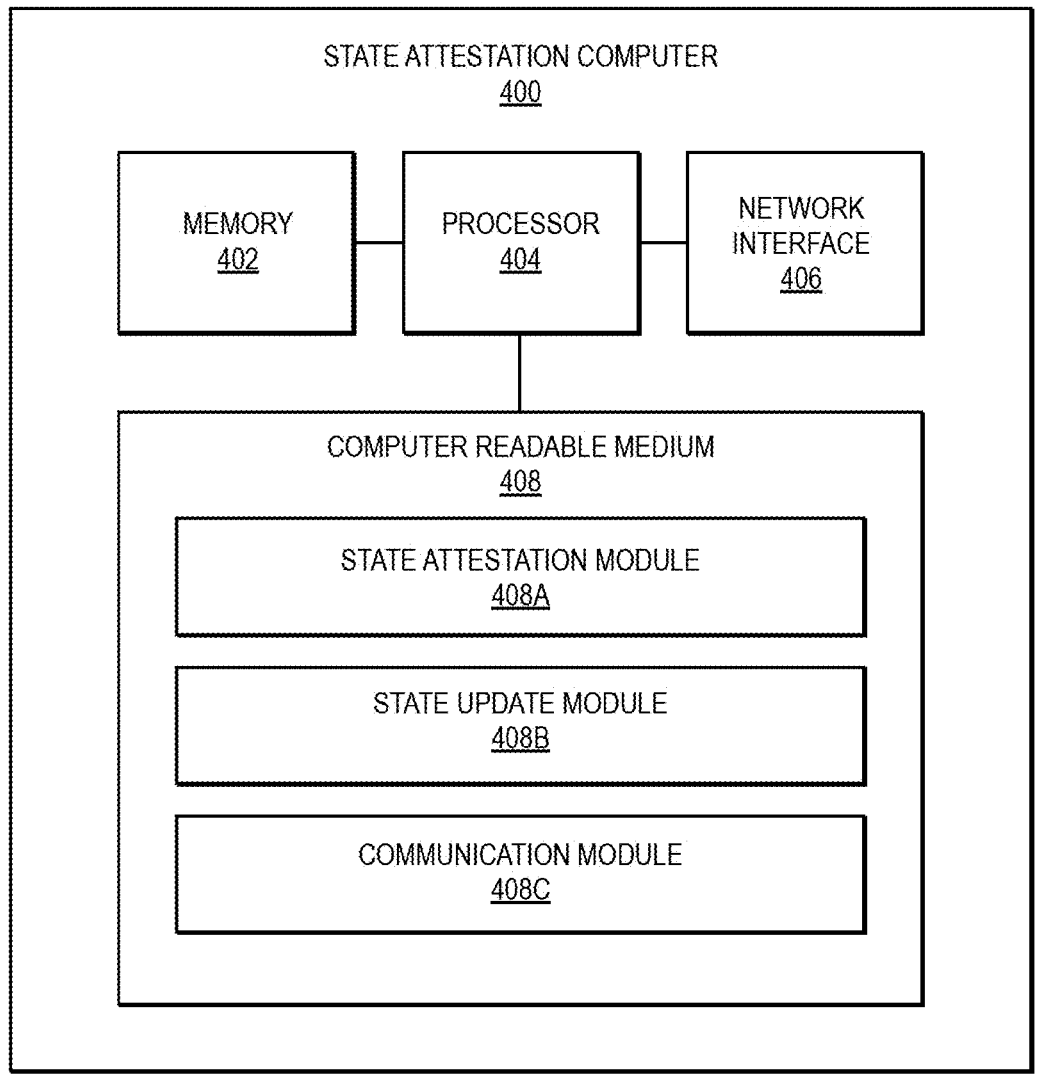
FIG. 4 shows a block diagram of components of a state attestation computer according to embodiments.

FIG. 4 shows a block diagram of a state attestation computer 400 according to embodiments. The exemplary interaction validation computer 400 may comprise a processor 404. The processor 404 may be coupled to a memory 402, a network interface 406, and a computer readable medium 408. The computer readable medium 408 can comprise a state attestation module 408A, a state update module 408B, and a communication module 408C.

The memory 402 can be used to store data and code and may be similar to the memory 202 as described herein. For example, the memory 402 can store one or more states, a state attestation computer public key, a state attestation computer private key, a state map, etc.

The computer readable medium 408 may comprise code, executable by the processor 404, for performing one or more methods described herein as being performed by a state attestation computer.

The state attestation module 408A may comprise code or software, executable by the processor 404, for attesting to the validity of a state. The state attestation module 408A, in conjunction with the processor 404, can attest to a received state if the state is determined to be valid.

For example, the state attestation module 408A, in conjunction with the processor 404, can receive a modified verify state request message from a user device via the communication module 408C. The modified verify state request message can include a user device public key, a random value, a state commitment, an index commitment, and a signature created by the interaction processing computer on the index commitment and the state commitment using the interaction processing computer private key (e.g., a first commitment signature).

The state attestation module 408A, in conjunction with the processor 404, can determine whether or not the user device is enrolled in the system. For example, the state attestation module 408A, in conjunction with the processor 404, can determine whether or not the user device public key matches a previously stored (during enrollment) user device public key. In some embodiments, the state attestation module 408A, in conjunction with the processor 404, can determine if the user device is enrolled if the state attestation computer 400 stores a state map, which maps states to public keys, includes the received user device public key.

The state attestation module 408A, in conjunction with the processor 404, can also verify the state commitment. The state attestation module 408A, in conjunction with the processor 404, can verify the state commitment using the state commitment, the state of the user device (which can be obtained using the state map), and the random value. The commitment can be verified in any suitable manner known to one of skill in the art. For example, the state commitment can be verified by using the received random value, the state commitment, and the previously stored state signature (e.g., stored in the state map during enrollment or updated during a previous interaction).

For example, if the commitment creation process involved hashing together the state signature and the random value, the state attestation module 408A, in conjunction with the processor 404, can hash together the previously stored state signature and the random value to obtain a comparison state commitment. The state attestation module 408A, in conjunction with the processor 404, can compare the state commitment to the comparison state commitment. If the state commitment and the comparison state commitment match, then the state attestation module 408A, in conjunction with the processor 404, can determine that the state commitment is valid. If the state commitment and the comparison state commitment do not match, then the state attestation module 408A, in conjunction with the processor 404, can determine that the state commitment is not valid. The verification of a commitment is described in reference to hashing, however, it is understood that any suitable commitment creation and verification process can be utilized as known to one of skill in the art.

The state attestation module 408A, in conjunction with the processor 404, can verify the signature created by the interaction processing computer on the index commitment and the state commitment using the interaction processing computer private key. The state attestation module 408A, in conjunction with the processor 404, can verify the signature using the interaction processing computer public key. Once the signature is determined to be valid, the state attestation module 408A, in conjunction with the processor 404, can determine the index commitment and the state commitment to be valid.

After verifying the data described above, the state attestation module 408A, in conjunction with the processor 404, can determine that the state is valid (or not valid, if the above verifications failed). If the state is valid, the state attestation module 408A, in conjunction with the processor 404, can generate a signature on a combination of the index commitment and the state commitment using a state attestation computer private key.

The state update module 408B can include may comprise code or software, executable by the processor 204, for updating a state stored in a state map that associates user device public keys to user device states. For example, the state update module 408B, in conjunction with the processor 404, can receive a state update message from a user device. The state update message can include a user device public key and a signature created by the interaction processing computer on a combination of a new identifier commitment and a new balance commitment using the state interaction processing computer private key. The state update message can further include a random value and a signature created by the interaction processing computer on a combination of the state commitment and the aforementioned signature using the interaction processing computer private key.

The state update module 408B, in conjunction with the processor 404, can verify whether or not the user device is enrolled, as described herein. The state update module 408B, in conjunction with the processor 404, can further verify one or more signatures using the relevant public key corresponding to the private key that was used to create the signature.

After verifying the new state, the state update module 408B, in conjunction with the processor 404, can store a received new state commitment in place of the previously stored state commitment in a state map that maps the state and the user device public key.

The communication module 408C can include may comprise code or software, executable by the processor 404, for communicating with other devices. The communication module 408C may have similar to the communication module 208C of the user device 200 of FIG. 2, and many of the details thereof will not be repeated here.

The network interface 406 may be similar to the network interface 206 and many of the details thereof will not be repeated here.

III. Methods

Figure 5:
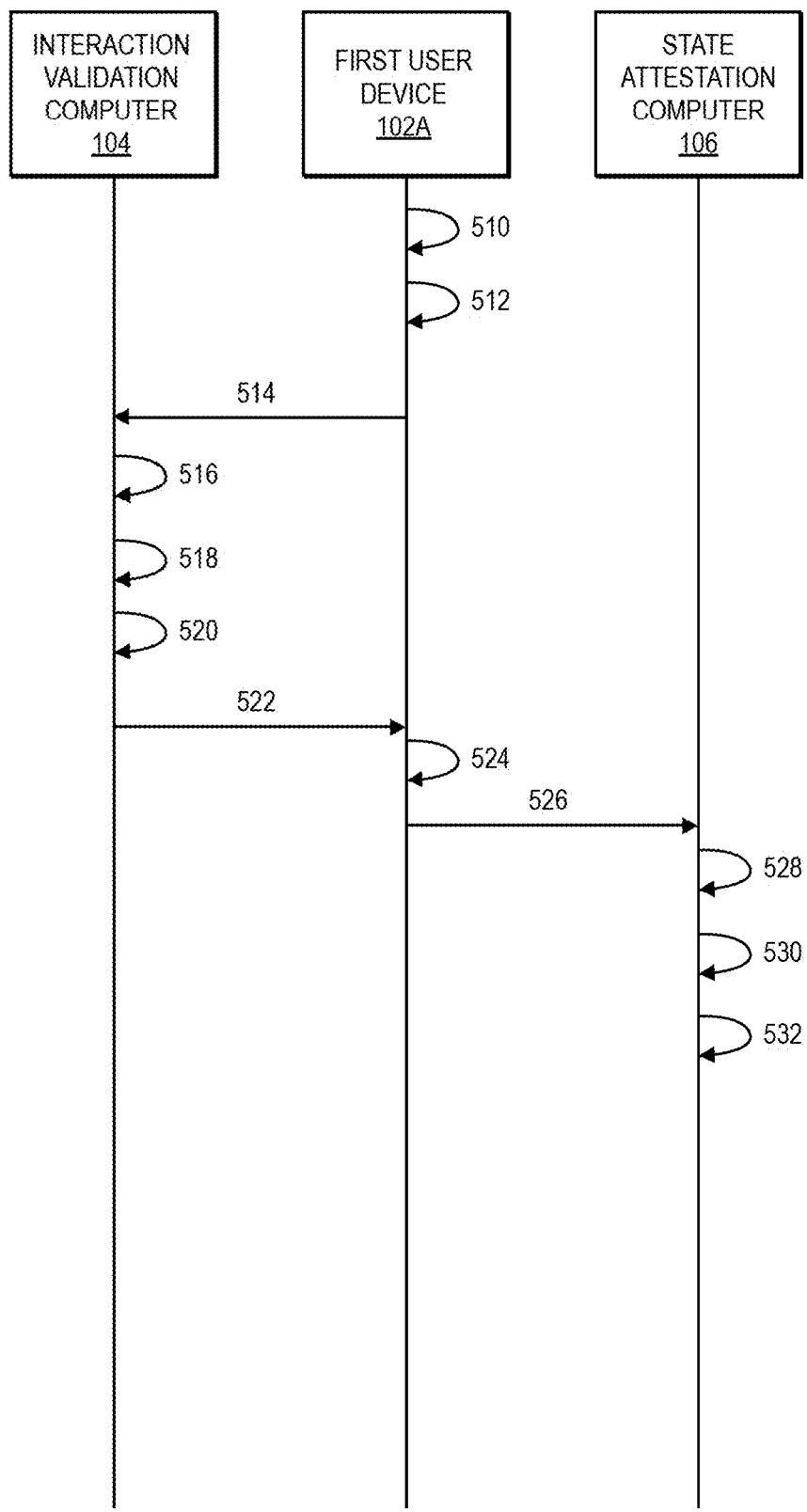
FIG. 5 shows a flow diagram illustrating an enrollment method according to embodiments.

Embodiments can use the systems and apparatuses described herein to at least process zero-knowledge interactions where the central validation authority does not need to verify the balance or identify of the interaction requestor directly. FIGS. 5-7 describe some examples of such methods.

Embodiments can utilize a signature scheme $\Sigma$ that includes at least three algorithms ($\Sigma$. KeyGen, $\Sigma$. Sign, $\Sigma$. Verify), where $\Sigma$. KeyGen generates a signing and verification key-pair (sk,vk), $\Sigma$. Sign generates a signature $\sigma$ using sk, and $\Sigma$. Verify verifies a signature $\sigma$ using vk. The variables (sk, vk) of the key pair can be a private key and a public key, respectively.

Embodiments can also utilize a commitment scheme Com that includes at least two algorithms (Com. Commit, Com. Verify), where Com. Commit generates a commitment com using some randomness r, and Com. Verify verifies a commitment com using the opening or randomness r.

Embodiments can also utilize a non-interactive zero-knowledge proof system NIZK that includes at least three algorithms (NIZK. CRSGen, NIZK. Prove, NIZK. Verify), where NIZK. CRSGen generates a common reference string (CRS) crs, NIZK. Prove generates a non-interactive zero-knowledge proof $\pi$ using a witness w, and NIZK. Verify verifies a non-interactive zero-knowledge proof $\pi$ using crs. In the following discussion, the common reference string crs used by the plurality of user devices, the interaction validation computer, and the state attestation computer will be ignored for ease of explanation. It is understood, however, that the common reference string crs can be utilized by each device in the system when verifying a non-interactive zero-knowledge proof.

Furthermore, in the description below, it can be assumed that all devices involved in the system have executed $\Sigma$. KeyGen and have signing and verification key-pairs. In other words, the device can be assumed to have pre-generated public/private key pairs. In particular, let ($sk_s$, $vk_s$), $(sk_T, vk_T)$, $(sk_A, vk_A)$ and $(sk_B, vk_B)$ denote the key-pairs of the interaction validation computer S, the state attestation computer T, a first user device A, and a second user device B, respectively. Furthermore, the interaction validation computer public key $vk_s$ can be known to the state attestation computer T, the first user device A, and the second user device B, and that the state attestation computer public key $vk_T$ is known to the interaction validation computer S.

As described herein, the interaction validation computer S stores a key-value map InteractionMapping where the keys are interaction indices and the corresponding values are the interaction objects (e.g., an amount commitment created by a user device). The state attestation computer T stores a key-value map StateMapping where the keys are verification keys (e.g., user device public keys) and the corresponding values are the most recent states and/or portions of states (e.g., a state signature σ).

Three methods will be described below—an enrollment method, an interaction issuance method, and an interaction reception method. Each method will be first pictorially/ mathematically described. The following three method descriptions included in Tables 1-3 illustrate high level steps of each process. The remainder of the section will describe each of the flows in complete detail.

TABLE 1

Enrollment

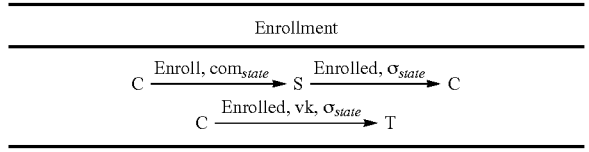

TABLE 2

Interaction Issuance

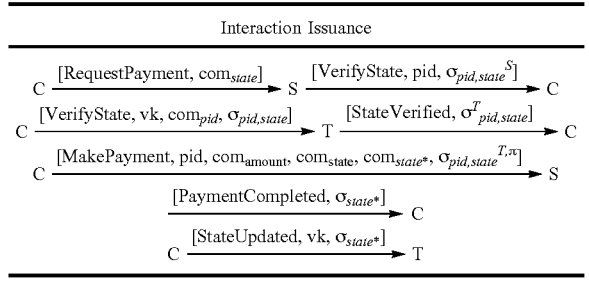

TABLE 3

Interaction Reception

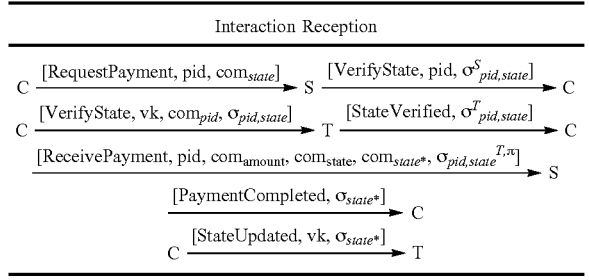

A. Enrollment

FIG. 5 shows a flow diagram illustrating an enrollment method according to embodiments. The method illustrated in FIG. 5 will be described in the context of a user of a user device enrolling in an interaction processing system. It is understood, however, that the invention can be applied to other circumstances.

Let C denote a first user device 102A. The first user device 102A (C) can enroll with an interaction validation computer 104 and a state attestation computer 106.

The first user device 102A (C) can begin to enroll with an account balance $bal_C$ in the system.

Prior to step 510, the first user device 102A can generate two random values $r_1$ and $r_2$. The first user device 102A can also initialize a starting serial number $S\ell No_C$. The first user device 102A can initialize the starting serial number to a value of one (e.g., $S\ell No_C = 1$).

At step 510, the first user device 102A (C) can generate a commitment to a user device identifier id and account balance $bal_C$. The first user device 102A can generate an identifier commitment using a user device public key $vk_C$, the serial number $S\ell No_C$, and a first random value $r_1$. For example, the first user device 102A (C) can generate the identifier commitment, which commits the first user device 102A (C) to the identifier, as follows:

$$com_{id_C} = Com.Commit([vk_C, S\ell No_C]; r_1)$$

The first user device 102A (C) can then generate a balance commitment using the balance $bal_C$ and the second random value $r_2$. For example, the first user device 102A (C) can then generate the balance commitment, which commits the first user device 102A (C) to the balance, as follows:

$$com_{bal_C} = Com.Commit(bal_C; r_2)$$

At step 512, the first user device 102A (C) can then generate a non-interactive zero-knowledge proof π as follows.

$$\pi = NIZK.Prove(com_{id_C}, com_{bal_C}; vk_C, bal_C, r_1, r_2)$$

The non-interaction zero-knowledge proof π, also referred to as an enrollment proof, can prove that there exists a user device public key, a balance, a first random value, and a second random value (e.g., $vk_C, bal_C, r_1, r_2$, respectively) such that 1) Com.Verify($com_{id_C}$, [$vk_C$, 1]; $r_1$) passes; 2) Com.Verify($com_{bal_C}$; $r_2$) passes; and 3) 3. $bal_C \geq 0$. In other words, the enrollment proof π can prove that the public key is committed to, the balance is committed to, and that the balance is greater than or equal to zero.

The enrollment proof π proves that the first user device 102A C has the verification key $vk_C$, serial number $S\ell No_C = 1$ and a non-negative balance $bal_C$, without revealing $vk_C$ or $bal_C$.

At step 514, after generating the non-interactive zero-knowledge proof π, the first user device 102A can transmit the identifier commitment, the balance commitment, and the enrollment proof to the interaction validation computer 104 S. In some embodiments, the first user device 102A can include the identifier commitment, the balance commitment, and the enrollment proof in an enrollment request message. The first user device 102A can send the enrollment request message to the interaction validation computer 104 S. For example, the first user device 102A can send the message [Enroll, $com_{id_C}$, $com_{bal_C}$, π] to the interaction validation computer 104 S for enrollment.

At step 516, after receiving the enrollment request message the interaction validation computer S can verify the enrollment proof it by checking that non-interactive zero-knowledge verification algorithm NIZK.Verify(ff) passes. For example, the non-interactive zero-knowledge verification algorithm NIZK.Verify(π) can output a value of 1 if the enrollment proof it is valid. The non-interactive zero-knowledge verification algorithm NIZK.Verify(π) can output a value of 0 if the enrollment proof π is not valid (e.g., verification failed). In some embodiments, if the enrollment proof $\pi$ is not valid, the interaction validation computer 104 can generate a proof failed message that indicates that the enrollment proof it is not valid. The interaction validation computer 104 can provide the proof failed message to the first user device 102A.

At step 518, after determining that the enrollment proof is valid, the interaction validation computer 104 S can generate a signature $\sigma_C$ on a combination of the identifier commitment and the balance commitment using a interaction validation computer private key $sk_s$. The resulting signature can be a state signature.

$$\sigma_C = \Sigma. \text{Sign}([com_{id_C}, com_{bal_C}]; sk_S)$$

At step 520, after generating the signature, the interaction validation computer 104 can generate an enrollment response message. The enrollment response message can include an indication of whether or not the first user device 102A is enrolled, and the state signature $\sigma_C$.

At step 522, after generating the enrollment response message, the interaction validation computer 104 can provide the enrollment response message to the first user device 102A.

At step 524, at any point in time after receiving the enrollment response message, the first user device 102A can generate an enrolled indication message that can indicate to a state attestation computer 106 that the first user device 102A has been enrolled. The enrolled indication message can include the user device public key, the balance commitment, the first random value, and the state signature (e.g., [Enrolled, $vk_C$, $com_{bal_C}$, $r_1$, $\sigma_C$]).

At step 526, after generating the enrolled indication message, the first user device 102A can provide the enrolled indication message to the state attestation computer 106.

At step 528, after receiving the enrolled indication message, the state attestation computer 106 (T) can verify that the first user device 102A was not previously enrolled. For example, the state attestation computer 106 can retrieve a state mapping from memory. The state mapping can map user device states to user device public keys. The state attestation computer 106 can check if the state mapping includes the user device public key (e.g., StateMapping[$vk_C$]=⊥ (note that StateMapping[$vk_C$]=⊥ when $vk_C$ has not enrolled)). If state mapping already includes the user device public key, the state attestation computer 106 can generate an enrollment failed response since the first user device 102A has previously enrolled.

At step 530, after verifying that the first user device 102A has not previously enrolled, the state attestation computer 106 can verify the state signature $\sigma_C$. For example, the state attestation computer 106 can perform the following operation $\Sigma.\text{Verify}(\sigma_C, [\text{Com.Commit}([vk_C, 1]; r_1), com_{bal_C}]; vk_S)$. The state attestation computer 106 can verify the state signature $\sigma_C$ using the interaction validation computer public key corresponding to the interaction validation computer private key used to form the state signature.

At step 532, if the user device state is valid, then the state attestation computer 106 can add the user device state signature $\sigma_C$ and the user device public key $vk_C$ to the state map (e.g., StateMapping[$vk_C$]=$\sigma_C$).

We will henceforth refer to $\sigma_C$ and all elements of its payload as the state of C, denoted by $state_C$. More formally, we will define $state_C$=[$vk_C$, $S\ell No_C$, $r_1$, $bal_C$, $r_2$, $\sigma_C$]. Note that $com_{id_C}$ and $com_{bal_C}$ can always be generated from $state_C$ and hence we consider them to be part of $state_C$ (implicitly) as well.

B. Interaction Issuance

Figure 6A:
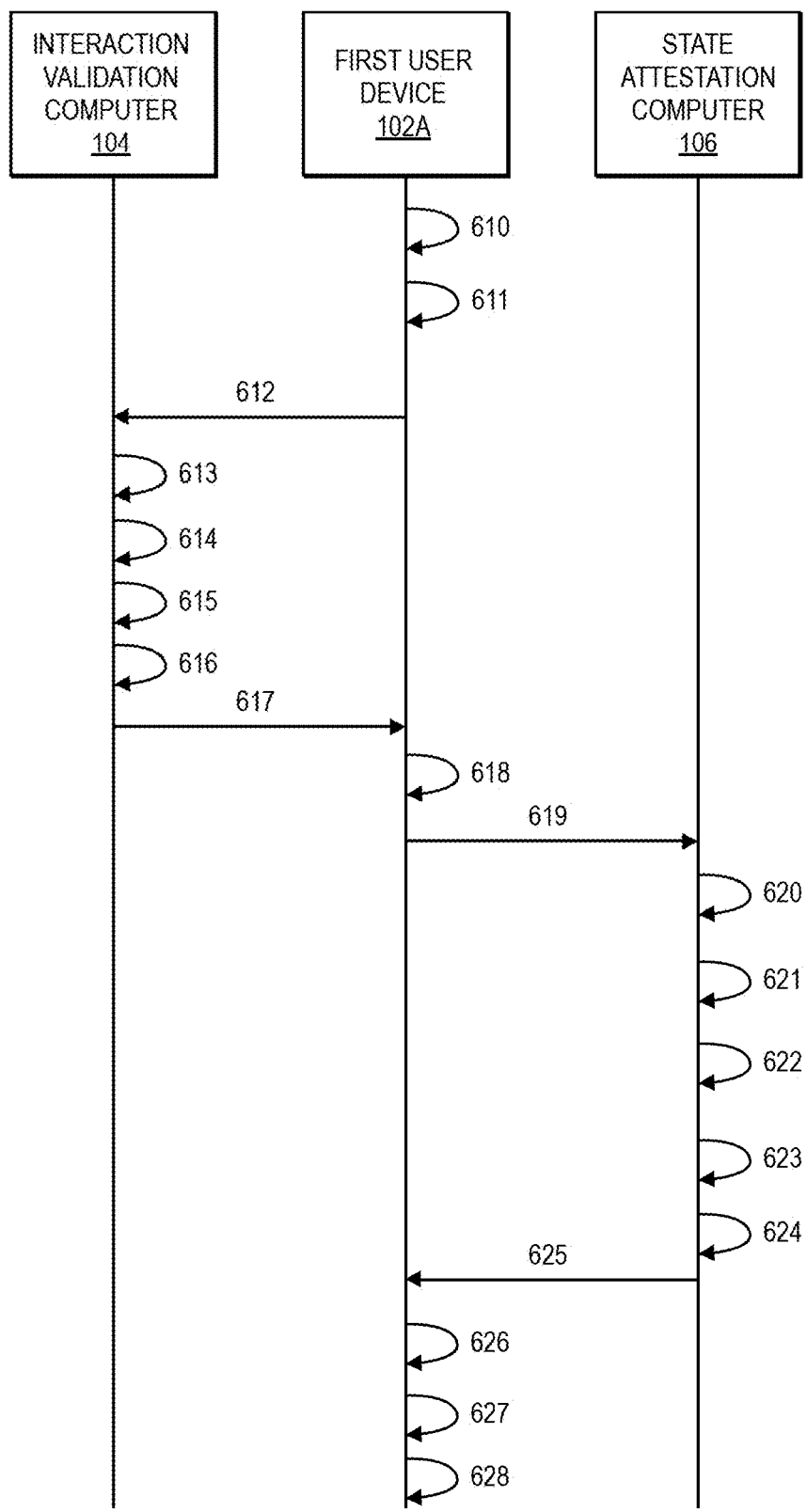
FIGS. 6A-6B show a flow diagram illustrating an interaction issuance method according to embodiments.
Figure 6B:
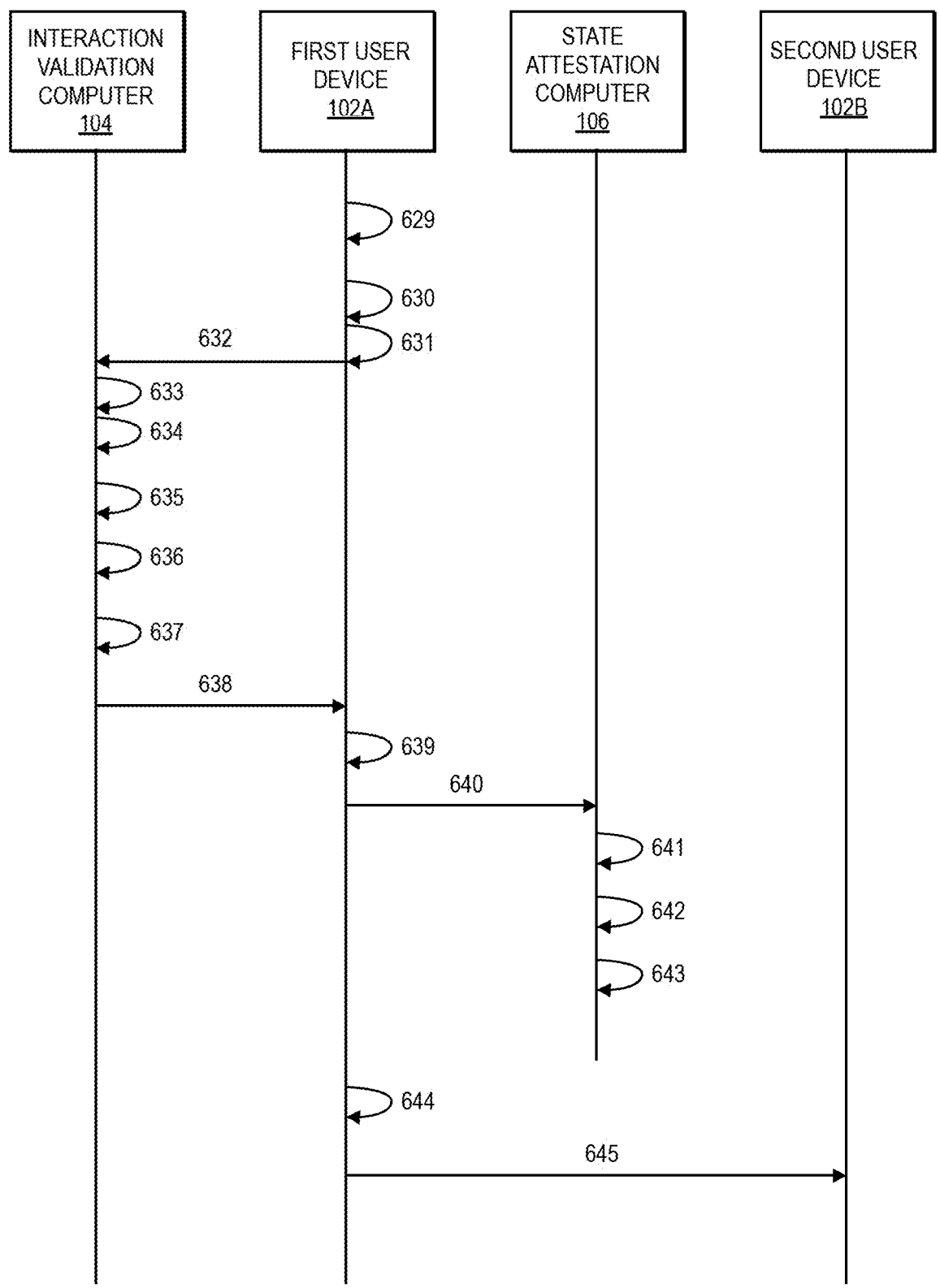

FIGS. 6A-6B show a flow diagram illustrating an interaction issuance method according to embodiments. The method illustrated in FIGS. 6A-6B will be described in the context of a first user device 102A initiating a transfer of an amount to a second user device 102B. It is understood, however, that embodiments of the invention can be applied to other circumstances (e.g., transferring an amount of data, an amount of digital currency, an amount of fiat currency, etc.).

The first user device 102A can be denoted as A, while the second user device 102B can be denoted as B. The first user device 102A can transfer an amount amount to the second user device 102B. The transfer can be facilitated by an interaction validation computer 104 and a state attestation computer 106.

Prior to step 610, the current state of the first user device 102A (A) can be:

$$state_A = [vk_A, S\ell No_A, r_1, bal_A, r_2, \sigma_A]$$

The state can include a user device public key $vk_A$, a serial number $S\ell No_A$, a first random value $r_1$, a balance $bal_A$, a second random value $r_2$, and a state signature $\sigma_A$.

At step 610, the first user device 102A A can generate a commitment to its state (e.g., $com_{\sigma_A}$=Com.Commit($\sigma_A$; r), where a random value r has been chosen by A from the first random value $r_1$ and the second random value $r_2$). The first user device 102A can generate the state commitment using any suitable commitment creation process. For example, the first user device 102A can generate the state commitment $com_{\sigma_A}$ by hashing together the state signature $\sigma_A$ and the random value r.

At step 611, after generating the state commitment, the first user device 102A can generate an interaction request message. The interaction request message (e.g., [RequestPayment, $com_{\sigma_A}$]) can include the state commitment $com_{\sigma_A}$.

At step 612, after generating the interaction request message, the first user device 102A can transmit the interaction request message (e.g., [RequestPayment, $com_{\sigma_A}$]) to the interaction validation computer 104.

At step 613, after receiving the interaction request message (e.g., [RequestPayment, $com_{\sigma_A}$]), the interaction validation computer 104 can generate an index pid, which may be a payment index. The index can be a next available interaction index. Each subsequent interaction processed by the interaction validation computer 104 can include a next available interaction index that is incremented by a predetermined amount after each interaction. For example, the first interaction index can be 1, the second interaction index can be 2, the third interaction index can be 3, etc.

At step 614, after generating the index, the interaction validation computer 104 can generate a commitment to the index (e.g., an index commitment). For example, the interaction validation computer 104 can generate the index commitment as $com_{pid}$=Com.Commit(pid; r'), where a random value r' is generated by the interaction validation computer 104.

At step 615, the interaction validation computer 104 can generate a first commitment signature based on the combination of the index commitment ($com_{pid}$) and the state commitment ($com_{\sigma_A}$) using the interaction validation computer private key $sk_S$. For example, the interaction validation computer 104 can generate the first commitment signature as $\sigma_{pid\sigma_A}^S$=$\Sigma$.Sign([$com_{pid}$, $com_{\sigma_A}$]; $sk_S$).

At step 616, after creating the first commitment signature, the interaction validation computer 104 can generate a verify state request message that requests the first user device 102A to verify the state of the first user device 102A. The verify state request message can include the index pid, the random value r', index commitment $com_{pid}$, and the first commitment signature $\sigma_{pid,o_A}^S$. For example, the verify state request message can be [VerifyState, pid, r', $com_{pid}$, $\sigma_{pid,o_A}^S$].

At step 617, after generating the verify state request message, the interaction validation computer 104 can provide the verify state request message to the first user device 102A. For example, the interaction validation computer 104 can send the message [VerifyState, pid, r', $com_{pid}$, $\sigma_{pid,o_A}^S$] to the first user device 102A.

At step 618, after receiving the verify state request message (e.g., [VerifyState, pid, r', $com_{pid}$, $\sigma_{pid,o_A}^S$]), the first user device 102A can modify the verify the state in the verify state request message. The first user device 102A can modify the verify state request message to include the user device public key $vk_A$, the selected random value r, the state commitment $com_{o_A}$, the index commitment $com_{pid}$, and the first commitment signature $\sigma_{pid,o_A}^S$. The modified verify state request message may be [VerifyState, $vk_A$, r, $com_{o_A}$, $com_{pid}$, $\sigma_{pid,o_A}^S$].

At step 619, after modifying the verify state request message, the first user device 102A can provide the modified verify state request message to the state attestation computer 106 to request that the state attestation computer 106 attest to the validity of the current state of the first user device 102A. For example, the first user device 102A can transmit the message [VerifyState, $vk_A$, r, $com_{o_A}$, $com_{pid}$, $\sigma_{pid,o_A}^S$] to the state attestation computer 106.

At step 620, after receiving the verify state request message [VerifyState, $vk_A$, r, $com_{o_A}$, $com_{pid}$, $\sigma_{pid,o_A}^S$], the state attestation computer 106 can determine whether or not the first user device 102A is enrolled. The state attestation computer 106 can verify that the first user device 102A is enrolled using a state map as described above.

At step 621, after determining that the first user device 102A is enrolled, the state attestation computer 106 can verify the state commitment ($com_{o_A}$). For example, the state attestation computer 106 can verify the state commitment $com_{o_A}$ using the random value r, the state commitment $com_{o_A}$, and the previously stored state signature (e.g., stored in the state map during enrollment or updated during a previous interaction). The state attestation computer 106 can check that Com.Verify($com_{o_A}$, StateMapping[$vk_A$];r) passes.

For example, if the commitment creation process involved hashing together the state signature $\sigma_A$ and the random value r, the state attestation computer 106 can hash together the previously stored state signature and the random value to obtain a comparison state commitment. The state attestation computer 106 can compare the state commitment $com_{o_A}$ to the comparison state commitment. If the state commitment $com_{o_A}$ and the comparison state commitment match, then the state attestation computer 106 can determine that the state commitment is valid. If the state commitment $com_{o_A}$ and the comparison state commitment do not match, then the state attestation computer 106 can determine that the state commitment is not valid.

In some embodiments, if the state commitment is not valid, then the state attestation computer 106 can generate a state commitment verification failed message that indicates that the verification of the state commitment failed. The state attestation computer 106 can provide the state commitment verification failed message to the first user device 102A.

At step 622, after verifying the state commitment, the state attestation computer 106 can verify the first commitment signature $\sigma_{pid,o_A}^S$ generated by the interaction validation computer 104. The state attestation computer 106 can verify that the first commitment signature $\sigma_{pid,o_A}^S$ is signed with the interaction validation computer private key using the interaction validation computer public key $vk_S$. For example, the state attestation computer 106 can check that $\Sigma.\text{Verify}(\sigma_{pid,o_A}^S, [com_{pid}, com_{o_A}]; vk_S)$ passes.

In some embodiments, if the first commitment signature is not valid, then the state attestation computer 106 can generate a first commitment signature verification failed message that indicates that the verification of the first commitment signature failed. The state attestation computer 106 can provide the first commitment signature verification failed message to the first user device 102A.

At step 623, after verifying the first commitment signature $\sigma_{pid,o_A}^S$, the state attestation computer 106 can generate a second commitment signature $\sigma_{pid,o_A}^T$ based on a combination of the index commitment $com_{pid}$ and the state commitment $com_{o_A}$ using the state attestation computer private key $sk_T$. For example, the state attestation computer 106 can generate the second commitment signature as follows: $\sigma_{pid,o_A}^T = \Sigma.\text{Sign}([com_{pid}, com_{o_A}]; sk_T)$. By doing so, the state attestation computer 106 can attest to the current state of the first user device 102A for the current interaction index pid.

At step 624, after generating the second commitment signature $\sigma_{pid,o_A}^T$, the state attestation computer 106 can generate a verify state response message that indicates whether or not the state is verified. The verify state response message can include the second commitment signature $\sigma_{pid,o_A}^T$. The verify state response message can be [StateVerified, $\sigma_{pid,o_A}^T$].

At step 625, after generating the verify state response message, the state attestation computer 106 can provide the verify state response message [StateVerified, $\sigma_{pid,o_A}^T$] to the first user device 102A.

At step 626, after receiving the verify state response message, the first user device 102A can generate a commitment to the amount to be transferred in the interaction (e.g., an interaction amount). For example, the first user device 102A can generate an interaction amount commitment using the interaction amount amount and a random value $r_3$. The random value $r_3$ can be a third random value that is determined, or otherwise obtained, by the first user device 102A. The first user device 102A can generate the commitment as described herein. For example, the first user device 102A can generate the interaction amount commitment by performing $com_{amount} = \text{Com.Commit}(amount; r_3)$.

At step 627, after generating the amount commitment, the first user device 102A can determine a new partial state. The new partial state can include the user device public key $vk_A$, a new serial number $S\ell No^*_A$, a new balance amount $bal^*_A$, a new first random value $r^*_1$, and a new second random value $r^*_2$. The new state can also include a new state signature $\sigma^*_A$ after receiving the new state signature $\sigma^*_A$ later from the interaction validation computer 104. The new state can be $state^*_A = [vk_A, s\ell No^*_A, r^*_1, bal^*_A, r^*_2, \sigma^*_A]$.

However, for now, the first user device 102A generates the new partial state without the new state signature $\sigma^*_A$. The new partial state can be $state^*_A = [vk_A, S\ell No^*_A, r^*_1, bal^*_A, r^*_2]$.

In some embodiments, prior to generating the new partial state, the first user device 102A can generate the new serial number $S\ell No^*_A$. The first user device 102A can generate the new serial number $S\infty No^*_A$ based on the serial number $S\ell No_A$. For example, the new serial number $S\ell No^*_A$ can be determined by incrementing the serial number $S\ell No_A$ by a predetermined amount (e.g., 1). As such, the first user device 102A can generate the new serial number $S\ell No^*_A$ by performing $S\ell No^*_A = S\ell No_A + 1$.

In some embodiments, prior to generating the new partial state, the first user device 102A can generate the new balance $bal^*_A$. The first user device 102A can generate the new balance $bal^*_A$ based on the balance $bal_A$. For example, the new balance $bal^*_A$ can be determined by decreasing the balance $bal_A$ by the interaction amount. As such, the first user device 102A can generate the new balance $bal^*_A$ by performing $bal^*_A = bal_A - amount$.

In some embodiments, prior to generating the new partial state, the first user device 102A can generate the new first random value $r^*_1$ and the new second random value The first user device 102A can generate the new first random value $r^*_1$ and the new second random value $r^*_2$ randomly.

At step 628, the first user device 102A can generate a new identifier commitment $com_{id^*_A}$. The first user device 102A can generate the new identifier commitment $com_{id^*_A}$ using the user device public key $vk_A$, the new serial number $S\ell No^*_A$, and the new first random value $r^*_1$, as described in detail herein. For example, the first user device 102A can perform $com_{id^*_A} = Com.Commit([vk_A, S\ell No^*_A]; r^*_1)$.

According to FIG. 6B, at step 629, after generating the new identifier commitment $com_{id^*_A}$, the first user device 102A generates a new balance commitment $com_{bal^*_A}$. The first user device 102A can generate the new balance commitment using the new balance $bal^*_A$ and the new second random value as described in detail herein. For example, the first user device 102A can perform $com_{bal^*_A} = Com.Commit(bal^*_A; r^*_2)$.

At step 630, after generating the new identifier commitment $com_{id^*_A}$ and the new balance commitment $com_{bal^*_A}$, the first user device 102A can generate a non-interactive zero-knowledge proof π (e.g., a state proof). The first user device 102A can generate the non-interaction zero-knowledge proof π based on the interaction index pid, the state commitment $com_{\sigma_A}$, the amount commitment $com_{amount}$, the new identifier commitment $com_{id^*_A}$, the user device public key $vk_A$, the serial number $S\ell No_A$, the account balance $bal_A$, the state signature $\sigma_A$, the interaction amount amount, the chosen random value r, the first random value $r_1$, the second random value $r_2$, the third random value $r_3$, the new first random value $r^*_1$, and the new second random value $r^*_2$.

For example, the first user device 102A can generate the non-interaction zero-knowledge proof π by inputting the interaction index pid, the state commitment $com_{\sigma_A}$, the amount commitment $com_{amount}$, the new identifier commitment $com_{id^*_A}$, the user device public key $vk_A$, the serial number $S\ell No_A$, the account balance $bal_A$, the state signature $\sigma_A$, the interaction amount amount, the chosen random value r, the first random value $r_1$, the second random value $r_2$, the third random value $r_3$, the new first random value $r^*_1$, and the new second random value $r^*_2$ into a non-interaction zero-knowledge prove algorithm. This may be expressed as:

$$\pi = NIZK.Prove(pid, com_{\sigma_A}, com_{amount}, com_{id^*_A};$$
$$vk_A, S\ell No_A, bal_A, \sigma_A, amount, r, r_1, r_2, r_3, r^*_1, r^*_2)$$

In some embodiments, the non-interactive zero-knowledge prove algorithm can be a non-interactive zero-knowledge prove algorithm described in Jens Groth, Rafail Ostrovsky, Am it Sahai: Perfect Non-interactive Zero Knowledge for NP. EUROCRYPT 2006, for example, which is incorporated by reference herein in its entirety.

The proof π proves that state attested by the state attestation computer 106 is indeed a valid state produced by the interaction validation computer 104, that the new partial state has been constructed correctly, and that the interaction itself is valid (e.g., uses a non-negative interaction amount that does not exceed the currently available account balance), without revealing the most recent state, the new state or the interaction amount involved in the interaction. In further detail the proof π proves there exist $vk_A$, $S\ell No_A$, $bal_A$, $\sigma_A$, amount, r, $r_1$, $r_2$, $r_3$, $r^*_1$, $r^*_2$ such that the following properties are true:

1. $Com.Verify(com_{\sigma_A}, \sigma_A; r)$ passes;
2. $\Sigma.Verify(\sigma_A, [Com.Commit([vk_A, S\ell No_A]; r_1), Com.Commit(bal_A, r_2)]; vk_S)$ passes;
3. $Com.Verify(com_{amount}, amount; r_3)$ passes;
4. $Com.Verify(com_{id^*_A}, [vk_A, S\ell No_A + 1]; r^*_1)$ passes;
5. $Com.Verify(com_{bal^*_A}, bal_A - amount; r^*_2)$ passes;
6. amount ≥ 0;
7. $bal_A - amount \geq 0$.

At step 631, after generating the state proof, the first user device 102A can generate an interaction request message comprising the interaction index pid, the state commitment $com_{\sigma_A}$, the amount commitment $com_{amount}$, the new identifier commitment $com_{id^*_A}$, the balance commitment $com_{bal^*_A}$, the second commitment signature $\sigma_{pid,\sigma_A}^T$, and the zero-knowledge proof π, and the random value r', where r' is the random value received from the interaction validation computer 104 at step 617 and was used to create interaction index commitment. For example, the interaction request message may be [MakeInteraction, pid, r', $com_{\sigma_A}$, $com_{amount}$, $com_{id^*_A}$, $com_{bal^*_A}$, $\sigma_{pid,\sigma_A}^T$, π].

At step 632, the first user device 102A can transmit the interaction request message to the interaction validation computer 104. For example, the first user device 102A can transmit the message [MakeInteraction, pid, r', $com_{\sigma_A}$, $com_{amount}$, $com_{id^*_A}$, $com_{bal^*_A}$, $\sigma_{pid,\sigma_A}^T$, π] to the interaction validation computer 104.

At step 633, after receiving the interaction request message, the interaction validation computer 104 can verify the second commitment signature $\sigma_{pid,\sigma_A}^T$. The interaction validation computer 104 can verify the second commitment signature $\sigma_{pid,\sigma_A}^T$ using the state attestation computer public key that corresponds to the state attestation computer private key that was used to from the second commitment signature. For example, the interaction validation computer 104 can check that $\Sigma.Verify(\sigma_{pid,\sigma_A}^T, [Com.Commit(pid; r'), com_{\sigma_A}]; vk_T$ passes.

In some embodiments, if the interaction validation computer 104 determines that the second commitment signature $\sigma_{pid,\sigma_A}^T$ is not valid, the interaction validation computer 104 can generate a second commitment signature verification failed message comprising an indication that the second commitment signature $\sigma_{pid,\sigma_A}^T$ is not valid. The interaction validation computer 104 can transmit the second commitment signature verification failed message to the first user device 102A.

At step 634, after verifying the second commitment signature the interaction validation computer 104 can verify the state proof π. The interaction validation computer 104 can validate the state proof π by inputting the state proof π into a non-interactive zero-knowledge verification algorithm. If the state proof π is valid, the non-interactive zero-knowledge verification algorithm can output a 1. If the state proof π is not valid, the non-interactive zero-knowledge verification algorithm can output a 0. For example, the interaction validation computer 104 can verify the state proof π by checking that NIZK.Verify(π) passes.

In some embodiments, if the interaction validation computer 104 determines that the state proof π is not valid, the interaction validation computer 104 can generate a state proof verification failed message comprising an indication that the state proof π is not valid. The interaction validation computer 104 can transmit the state proof verification failed message to the first user device 102A.

At step 635, after verifying the state proof π, the interaction validation computer 104 can generate a plurality of signatures. For example, the interaction validation computer 104 can generate a third commitment signature $\sigma_{pid,amount}$, a fourth commitment signature $\sigma^*_A$, and a fifth commitment signature $\sigma_{o_A,o^*_A}$.

The interaction validation computer 104 can generate the third commitment signature $\sigma_{pid,amount}$ from the interaction index pid and the amount commitment $com_{amount}$. The third commitment signature $\sigma_{pid,amount}$ can be a commitment to the interaction amount for the current interaction index. For example, the interaction validation computer 104 can sign a combination of the interaction index pid and the amount commitment $com_{amount}$ using the interaction validation computer private key $sk_S$. The interaction validation computer 104 can generate the third commitment signature $\sigma_{pid,amount}$ by performing $\sigma_{pid,amount} = \Sigma\Sigma.Sign([pid, com_{amount}]; sk_S)$.

The interaction validation computer 104 can generate the fourth commitment signature $\sigma^*_A$ from the new identifier commitment $com_{id^*_A}$ and the new balance commitment $com_{bal^*_A}$. The fourth commitment signature $\sigma^*_A$ can be a new state signature that can be utilized by the first user device 102A to complete the new state. For example, the interaction validation computer 104 can sign a combination of the new identifier commitment $com_{id^*_A}$ and the new balance commitment $com_{bal^*_A}$ using the interaction validation computer private key $sk_S$. The interaction validation computer 104 can generate the fourth commitment signature $\sigma^*_A$ by performing $\sigma^*_A = \Sigma.Sign([com_{id^*_A}, com_{bal^*_A}]; sk_S)$.

The interaction validation computer 104 can generate the fifth commitment signature $\sigma_{o_A,o^*_A}$ from the state commitment $com_{o_A}$ and the fourth commitment signature $\sigma^*_A$ (e.g., the new state signature). For example, the interaction validation computer 104 can sign a combination of the state commitment $com_{o_A}$ and the fourth commitment signature $\sigma^*_A$ using the interaction validation computer private key $sk_S$. The interaction validation computer 104 can generate the fifth commitment signature $\sigma_{o_A,o^*_A}$ by performing $\sigma_{o_A,o^*_A} = \Sigma.Sign([com_{o_A}, \sigma^*_A]sk_S)$.

At step 636, after generating the plurality of signatures, the interaction validation computer 104 can update an interaction map that maps together interaction indices (e.g., pid) to amount commitments (e.g., $com_{amount}$). For example, the interaction validation computer 104 can add the index and amount commitment to the interaction map as follows: PaymentMapping[pid]=$com_{amount}$. The interaction map can be stored as any type of key value map.

At step 637, after adding the interaction index and the amount commitment to the interaction map, the interaction validation computer 104 can generate an interaction completed message. The interaction completed message can include the third commitment signature $\sigma_{pid,amount}$, the fourth commitment signature $\sigma^*_A$, and the fifth commitment signature $\sigma_{o_A,o^*_A}$. For example, the interaction validation computer 104 can take the form [InteractionCompleted, $\sigma_{pid,amount}$, $\sigma^*_A$, $\sigma_{o_A,o^*_A}$] to the first user device 102A.

At step 638, after generating the interaction completed message, the interaction validation computer 104 can provide the interaction completed message to the first user device 102A. For example, the interaction validation computer 104 can provide the message [InteractionCompleted, $\sigma_{pid,amount}$, $\sigma^*_A$, $\sigma_{o_A,o^*_A}$] to the first user device 102A.

At step 639, after receiving the interaction completed message, the first user device 102A can generate a state update request message. The state update request message can request the state attestation computer 106 to update the state stored by the state attestation computer 106 to the new state.

Furthermore, after receiving the interaction completed message, the first user device 102A has all of the data needed to complete the new state. In particular, the first user device 102A can include the received fourth commitment signature $\sigma^*_A$ as a new state signature into the new partial state to form the new state.

The first user device 102A can generate the state update request message to include the user device public key $vk_A$, the new state signature $\sigma^*_A$, the chosen random value r (e.g., which was also previously provided to the state attestation computer 106 at step 619), and the fifth commitment signature $\sigma_{o_A,o^*_A}$. The state update message can take the form [StateUpdated, $vk_A$, $\sigma^*_A$, r, $\sigma_{o_A,o^*_A}$].

At step 640, after generating the state update request message, the first user device 102A can provide the state update request message to the state attestation computer 106. For example, the first user device 102A can transmit the message [StateUpdated, $vk_A$, $\sigma^*_A$, r, $\sigma_{o_A,o^*_A}$] the state attestation computer 106.

At step 641, after receiving the state update request message, the state attestation computer 106 can determine whether or not the first user device 102A is enrolled, as described above.

At step 642, after determining that the first user device 102A is enrolled, the state attestation computer 106 can verify the new state signature $\sigma^*_A$. For example, the state attestation computer 106 can verify the new state signature $\sigma^*_A$ using the interaction validation computer public key $vk_S$ that corresponds to the interaction validation computer private key used to form the signature. For example, the state attestation computer 106 can perform $\Sigma Verify(\sigma_{o_A,o^*_A}, [Com.Commit(StateMapping[vk_A]; r), \sigma^*_A]; vk_S)$.

In some embodiments, if the state attestation computer 106 determines that the new state signature $\sigma^*_A$ is not valid, the state attestation computer 106 can generate a new state signature verification failed message comprising an indication that the new state signature $\sigma^*_A$ is not valid. The state attestation computer 106 can provide the new state signature verification failed message to the first user device 102A.

At step 643, after verifying the new state signature $\sigma^*_A$, the state attestation computer 106 can update the state map. For example, the state attestation computer 106 can edit the entry in the state map for the first user device 102A. The state attestation computer 106 can replace the state signature $\sigma_A$ with the new state signature $\sigma^*_A$. For example, the state attestation computer 106 can set StateMapping[$vk_A$]=$\sigma^*_A$.

At step 644, at any suitable point after receiving the interaction completed message at step 638, the first user device 102A can generate an interaction submitted notification message. The interaction submitted notification message can comprising the interaction index pid, the amount amount, the third random value $r_3$, and the third commitment signature $\sigma_{pid,amount}$.

At step 645, the first user device 102A can provide the interaction submitted notification message to a receiving device such as the second user device 102B. For example, the first user of the first user device 102A and the second user of the second user device 102B may have agreed to the interaction and the interaction amount. Once the first user device 102A obtains the third commitment signature $\sigma_{pid,amount}$, which indicates that the interaction validation computer 104 is committed to the interaction amount for the given interaction index, the first user device 102A can provide the relevant information to the second user device 102B, such that the second user device 102B can collect the interaction amount. For example, the first user device 102A can provide the message [InteractionCompleted, pid, amount, $r_3$, $\sigma_{pid,amount}$] to the second user device 102B.

This completes the process of the first user device 102A issuing an interaction to the second user device 102B for the amount amount. The second user device 102B may now verify whether or not the first user device 102A has indeed issued a valid interaction. Toward this end, the second user device 102B can check whether or not the third commitment signature $\sigma_{pid,amount}$ is valid. The second user device 102B can verify the third commitment signature $\sigma_{pid,amount}$ using the interaction validation computer public key $vk_S$ that corresponds to the interaction validation computer private key that was used to form the third commitment signature $\sigma_{pid,amount}$. For example, the second user device 102B can perform $\Sigma.Verify[\sigma_{pid,amount},[pid, Com.Commit(amount; r_3)]; vk_S]$. If the second user device 102B determines that the third commitment signature $\sigma_{pid,amount}$ is valid, then the second user device 102B is guaranteed to be able to receive the amount associated with this interaction.

C. Interaction Reception

Figure 7A:
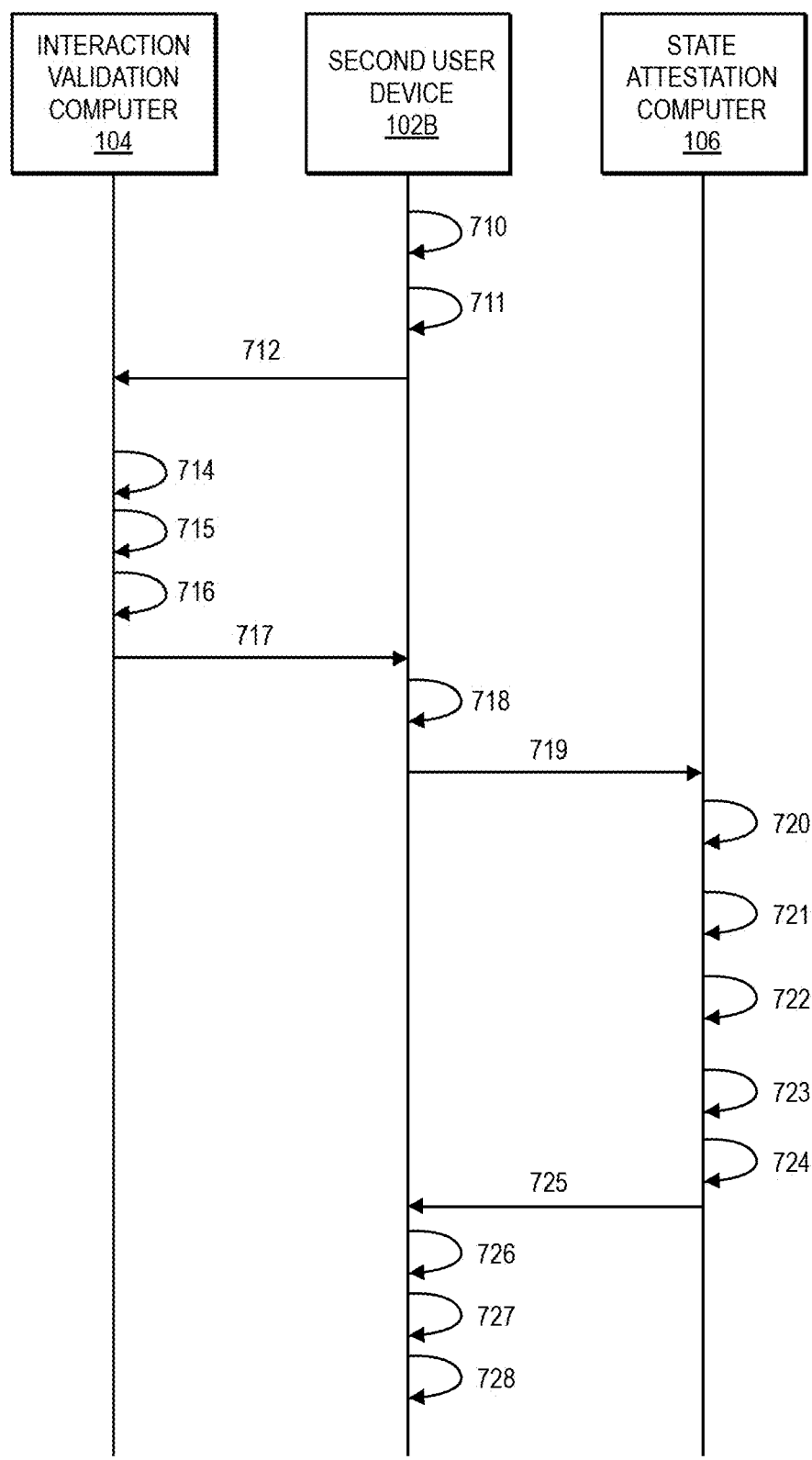
FIGS. 7A-7B show a flow diagram illustrating an interaction reception method according to embodiments.
Figure 7B:
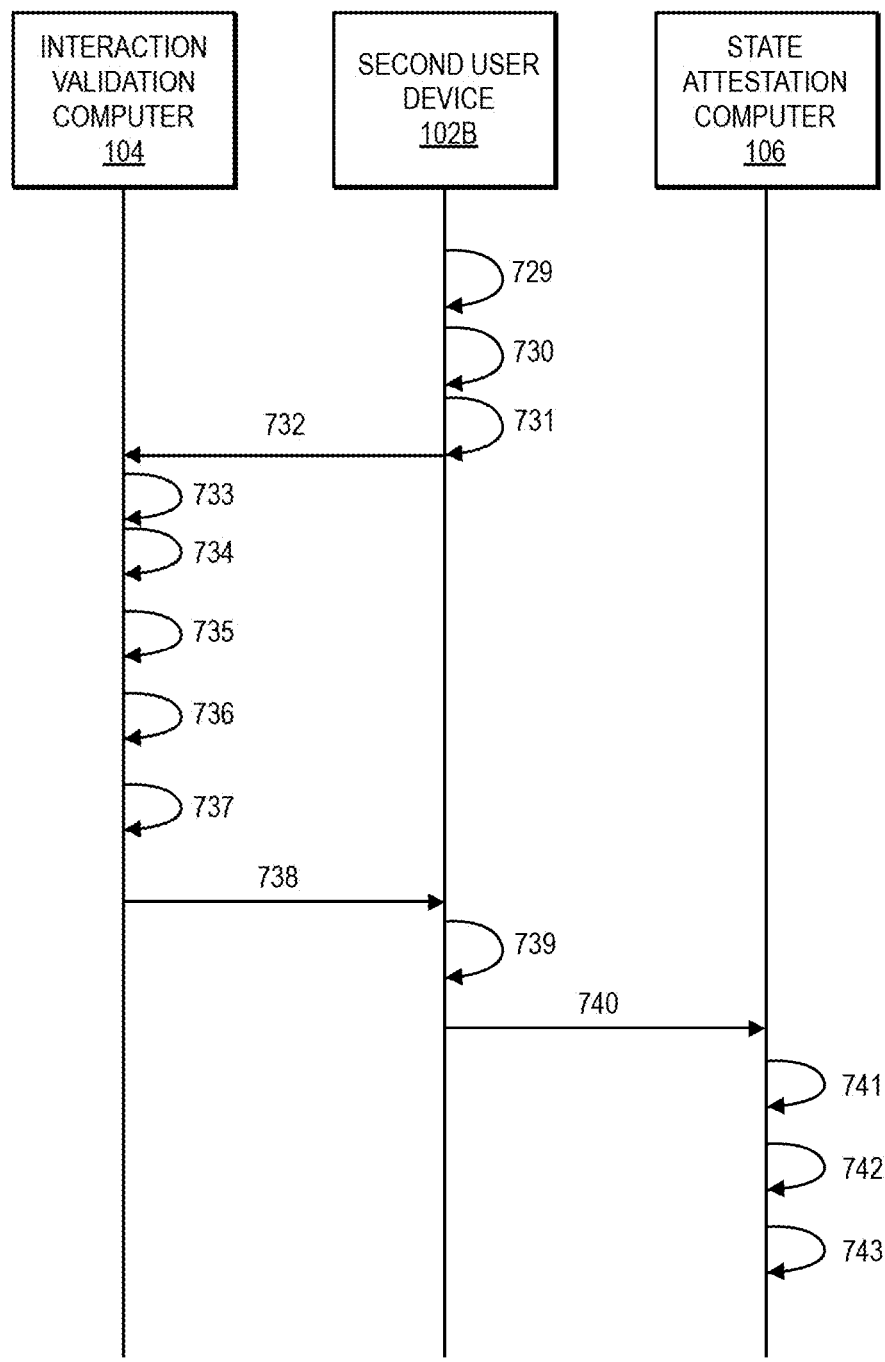

FIGS. 7A-7B shows a flow diagram illustrating an interaction reception method according to embodiments. The method illustrated in FIGS. 7A-7B will be described in the context of the second user device 102B, depicted as receiving an interaction submitted notification at step 645 of FIG. 6B, collecting the interaction amount into an account balance of an account maintained by the second user device 102B. It is understood, however, that the invention can be applied to other circumstances.

Suppose the second user device 102B (B) now attempts to receive the interaction (from the first user device 102A (A)) with an interaction index pid for an amount amount.

The process of the second user device 102B B receiving the first user device 102A A's interaction can be decoupled from the process of the first user device 102A A issuing the interaction. This asynchronous characteristic is an advantageous feature as now interactions are non-blocking. In particular, the first user device 102A A can issue an interaction with an amount to the second user device 102B B and does not need to remain in communication with any device in the system to further process the interaction. The second user device 102B B can be convinced of the validity of the interaction and can contact the interaction validation computer 104 at any later time to receive the amount.

Further, let $r_3$ be the randomness (e.g., a third random value) that was chosen by the first user device 102A A and provided to the second user device 102B B when the first user device 102A A issued the interaction.

The current state of the second user device 102B B may be $$state_B = [vk_B, S\ell No_B, r_1, bal_B, r_2, \sigma_B]$$

At step 710 (which may be similar to step 610 of FIG. 6B), the second user device 102 B B can generate a state commitment, which is a commitment to the current state. The state commitment can be created using a state signature $\sigma_B$ and a random value r chosen from a first random number $r_1$ and a second random number $r_2$ included in the state. The second user device 102 B can determine the state commitment as follows:

$$com_{\sigma_B} = Com.Commit(\sigma_B; r)$$

Steps 711-728 are similar to steps 611-628 of FIG. 6A and many of the details thereof will not be repeated here in its entirety, however, the mathematical notation is provided in reference to the second user device 102B B. Appropriate descriptions above can be incorporated herein.

At steps 711-712, the second user device 102B can generate and transmit an interaction request message to the interaction validation computer 104 (e.g., [RequestPayment, pid, $com_{\sigma_B}$]).

At steps 714, the interaction validation computer 104 can generate a commitment to the received interaction index (e.g., $com_{pid}$=Com.Commit(pid; r'), where a random value r' has been chosen by the interaction validation computer 104 S).

At step 715 the interaction validation computer 104 can create a first commitment signature (e.g., $\sigma_{pid,\sigma_B}^S = \Sigma.Sign([com_{pid}, com_{\sigma_B}]; sk_S)$, where $sk_S$ is an interaction validation computer private key).

At steps 716-717, the interaction validation computer 104 can generate and transmit a verify state request message to the second user device 102B (e.g., [VerifyState, r', $com_{pid}$, $\sigma_{pid,\sigma_B}^S$]).

At steps 718-719, the second user device 102B can modify and transmit the modified verify state request message to the state attestation computer 106 (e.g., [VerifyState, $vk_B$, r, $com_{\sigma_B}$, $com_{pid}$, $\sigma_{pid,\sigma_B}^S$]).

At steps 720-723, the state attestation computer 106 can verify user device enrollment, verify the state commitment, verify the first commitment signature, and generate a second commitment signature (e.g., verify StateMapping[$vk_B$]=⊥, where $vk_B$ is a second user device public key, verify $com_{\sigma_B}$ by checking that Com.Verify($com_{\sigma_B}$, StateMapping[$vk_B$]; r) passes, verify $\sigma_{pid,\sigma_B}^S$ by checking that $\Sigma.Verify(\sigma_{pid,\sigma_B}^S, [com_{pid}, com_{\sigma_B}]; vk_S)$ passes, and generate a second commitment signature $\sigma_{pid}^T = \Sigma.Sign([com_{pid}, com_{\sigma_B}]; sk_T)$, where $sk_T$ is a state attestation computer private key).

At steps 724-725, the state attestation computer 106 can generate and transmit a verify state response message to the second user device 102B (e.g., [StateVerified, $\sigma_{pid,\sigma_B}^T$]).

At steps 726-728, the second user device 102B can generate an amount commitment (e.g., $com_{amount}$=Com.Commit(amount; $r_3$)), determine a partial new state (e.g., state)*$_B$=[$vk_B$, $S\ell No*_B$, $r*_1$, $bal*_B$, $r*_2$, $\sigma*_B$], where $S\ell No*_B = S\ell No_B + 1$, $bal*_B = bal_B + amount$ and $r*_1$ and $r*_2$ have been chosen by the second user device 102B B, where $\sigma*_B$ will be obtained at a later stage, and hence why the second user device 102B B will only be able to partially generate state*$_B$ at the moment), and generate a new identifier commitment (e.g., $com_{id*_B}$=Com.Commit([$vk_B$, $S\ell No*_B$]; $r*_1$)).

Now referring to FIG. 7B, after generating the new identifier commitment, the second user device 102B can generate a new balance commitment. The second user device 102B can determine a new balance based on the amount included in the interaction and the account balance maintained by the second user device 102B. For example, the second user device 102B can add the interaction amount and the account balance to determine a new account balance. After determining the new balance, the second user device 102 can generate a new balance commitment (e.g., $com_{bal*_B}$=Com.Commit($bal*_B$; $r*_2$)).

Steps 730-743 are similar to steps 630-643 of FIG. 6B and many of the details thereof will not be repeated here in their entirety and the relevant descriptions are incorporated herein, however, the mathematical notation is provided in reference to the second user device 102B B.

At step 730, the second user device 102B generates a non-interactive zero-knowledge proof, for example, by performing the following:

$$\pi = \text{NIZK.Prove}(pid, com_{amount}, com_{\sigma_B}, com_{id^*_B}, com_{bal^*_B};$$
$$vk_B; S\ell\, No_B, bal_B, \sigma_B, \text{amount}, r, r_1, r_2, r_3, r^*_1, r^*_2)$$

The above proof proves that the following exist: $vk_B$, $S\ell\, No_B$, $bal_B$, $\sigma_B$, amount, $r$, $r_1$, $r_2$, $r_3$, $r^*_1$, $r^*_2$ such that 1) Com.Verify($com_{\sigma_B}$, $\sigma_B$; $r$) passes; 2) $\Sigma$.Verify($\sigma_B$, [Com.Commit([$vk_B$, $S\ell\, No_B$]; $r_1$), Com.Commit($bal_B$; $r_2$)]; $vk_S$) passes; 3) Com.Verify($com_{amount}$, amount; $r_3$) passes; 4) Com.Verify($com_{id^*_B}$, [$vk_B$, $S\ell\, No_B+1$]; $r^*_1$) passes; and 5) Com.Verify($com_{bal^*_B}$, $bal_B$+amount; $r^*_2$) passes.

The proof $\pi$ proves that the second user device 102b B's most recent state attested by the state attestation computer 106 T is indeed a valid state produced by the interaction validation computer 104 S and that their new state has been constructed correctly in accordance with the interaction, without revealing the most recent state, the new state, or the amount involved in the interaction.

At steps 731-732, the second user device 102B can generate and transmit an interaction request message to the interaction validation computer 104 (e.g., [ReceivePayment, pid, r', $com_{\sigma_B}$, $com_{amount}$, $com_{id^*_B}$, $com_{bal^*_B}$, $\sigma_{pid,\sigma_B}^T$, $\pi$]).

At steps 733-736, the interaction validation computer 104 verifies the second commitment signature, verifies the non-interactive zero-knowledge proof, generates signatures, and sets an interaction mapping (e.g., checks that $\Sigma$.Verify ($\sigma_{pid,\sigma_B}^T$, [Com.Commit(pid; r'), $com_{\sigma_B}$]; $vk_T$) passes, verifies $\pi$ by checking that NIZK.Verify($\pi$) passes, checks that InteractionMapping[pid]=$com_{amount}$, generates signatures $\sigma^*_B = \Sigma$.Sign([$com_{id^*_B}$, $com_{bal^*_B}$]$sk_S$ and $\sigma_{\sigma_B, \sigma^*_B} = \Sigma$.Sign ([$com_{\sigma_B}$, $\sigma^*_B$]; $sk_S$), and then sets InteractionMapping[pid]= received).

At steps 737-738, the interaction validation computer 104 can generate and transmit an interaction completed message to the second user device 102B (e.g., [PaymentReceived, $\sigma^*_B$, $\sigma_{\sigma_B}$, $\sigma^*_B$]).

At steps 739-740, the second user device 102B can generate and transmit a state update request message to the state attestation computer 106 (e.g., [StateUpdated, $vk_B$, $\sigma^*_B$, r, $\sigma_{com_B, \sigma^*_B}$]).

At steps 741-743, the state attestation computer 106 can verify the enrollment status of the second user device 102B, verify one or more signatures created by the interaction validation computer 104, and updates the state mapping (e.g., check if StateMapping[$vk_B$]=$\perp$, verify $\sigma^*_B$ by checking that $\Sigma$.Verify($\sigma_{\sigma_B, \sigma^*_B}$, [Com.Commit(StateMapping [$vk_B$]; r), $\sigma^*_B$]; $vk_S$) passes, and set StateMapping[$vk_B$]= $\sigma^*_B$).

IV. Security

In describing the security of various embodiments, references will be made to Tables 1-3, above, where $C \in \{A, B\}$ denote one of the users.

The messages received by the interaction validation computer over the course of the methods can include:
1. [Enroll, $com_{state}$]
2. [RequestPayment, $com_{state}$]
3. [RequestPayment, pid, $com_{state}$]
4. [MakePayment, pid, $com_{amount}$, $com_{state}$, $com_{state^*}$, $\sigma_{pid,state}^T$, $\pi$]
5. [ReceivePayment, pid, $com_{amount}$, $com_{state}$, $com_{state^*}$, $\sigma_{pid,state}$, $\pi$].

The interaction validation computer sees the interaction index pid in the clear. Furthermore, since commitments are freshly generated in every interaction, it is not possible for the interaction validation computer S to link data across interactions.

Similarly, the messages received by the state attestation computer T over the course of the methods can include:
1. [Enrolled, vk, $\sigma_{state}$]
2. [VerifyState, vk, $com_{pid}$, $\sigma_{pid,state}$]
3. [StateUpdated, vk, $\sigma_{state^*}$].

The state attestation computer T sees the user device public key vk in the clear.

In this manner, it can be concluded that the system according to embodiments offers users privacy and anonymity with respect to the interaction validation computer S and privacy with respect to the state attestation computer T. It can also be noted that the state attestation computer T will not be in a position to link end points of an interaction any better than guessing from the flow of interactions with the users.

Furthermore, embodiments can prevent double spending. In order for issuing and receiving interactions, user devices have their state verified by the state attestation computer T. Embodiments ensure that such calls are blocking. In other words, state verification and update can be performed atomically and cannot be interleaved. This ensures that a party cannot issue multiple interactions starting from the same balance, thus preventing double spending. Since each processed interaction passes through the state attestation computer T, it suffices for the state attestation computer T to verify whether or not the user is double spending, while the interaction validation computer S may not need to verify whether or not the user is double spending. Also note that users will not be able to issue interactions while having insufficient funds due to having to produce a proof that they do have sufficient funds.

Therefore, that amounts can neither be stolen nor created in the system according to embodiments.

V. Reversing Interactions

Embodiments further provide for systems and methods in which interactions can be reversed. An interaction may be reversed due to unclaimed amounts and disputed interactions, for example.

The reversal of interactions according to embodiments will be compared and contrasted to a standard debit account system. In the standard debit account system, if a first person were to write a check to a second person, and if the check is not cashed within a certain (pre-agreed) amount of time, then the check "expires" and the recipient is no longer able to receive those funds. The zero-knowledge interaction system according to embodiments can achieve such an expiry situation. However, there are major differences from regular debit account systems. In the example of writing a check, the funds are not removed from the interaction initiator's account until the check has been cashed. In contrast, according to embodiments, this is not the case. For example, as soon as an interaction is issued, an interaction amount is moved out of the user maintained account. This interaction amount is not available for spending elsewhere during this time. This presents a technical problem of how to reverse the interaction when the amount is already removed from the interaction initiator's account, but yet provided to the receiver's account. As described further below, should the interaction expire (e.g., the receiver does not claim the interaction amount using an interaction reception process as depicted in FIGS. 7A-7B within a predetermined amount of time), the interaction amount may be provided back into the interaction initiator's account.

An interaction can have an expiry time (e.g., 10 minutes, 1 hour, 12 hours, 1 day, 1 week, etc.), that can be agreed upon by the users involved in the interaction. The expiry time will be made available in the clear to the interaction validation computer S. Thus, as an additional step during the interaction reception method, the interaction validation computer S will verify whether the interaction has expired or not. This guarantees that interaction will in fact expire.

The interaction initiator can initiate the reversal of the interaction once the interaction is expired and can then obtain the unclaimed interaction amount. One method in which the interaction initiator can reverse the interaction can be to introduce a reversal flow that is similar to the interaction reception flow. As such, the imitation initiator can be said to receive the expired interaction.

However, the interaction initiator needs to be able to prove that they are the one attempting to receive the expired interaction, that is, that they were the one who issued the interaction in the first place and should be able to receive the interaction after it has expired. Toward this end, interactions can also involve have an interaction initiator token. The interaction initiator token can be a random string of values that can act as an identifier for the interaction initiator. The interaction initiator token can be randomized such that the interaction validation computer S will not be able to break anonymity in any way by leveraging the interaction initiator token(s). Additionally, the interaction initiator can be the only party, in some embodiments, that would be able to prove ownership of their interaction initiator token.

As an example, an interaction initiator token could be a commitment that only the interaction initiator knows the opening to. The interaction validation computer S can store the interaction along with the expiry time and the interaction initiator token, which can be received from the interaction initiator (e.g., the first user device 102A). During the interaction reception flow, the interaction validation computer S can ensure that the interaction has not yet expired (e.g., by comparing the expiry time to the current time at). During an interaction reversal flow, the interaction validation computer S can ensure that the interaction has expired and that the receiver of the interaction amount (which will be the interaction initiator that is reversing the interaction) is able to claim ownership of the associated interaction initiator token.

Another technical problem, that is solved by embodiments, is: how does an interaction initiator know that an interaction that they made has expired, since the interaction validation computer S cannot inform them because the interaction validation computer S does not know who the interaction initiator is on account of anonymity.

A first technical solution to this technical problem is to have the user device(s) check in with the interaction validation computer S over time to check an expiry status of the interaction. As such, if an interaction amount has been received by the receiver device (e.g., the second user device 102B), the interaction cannot be reversed. But this can more cumbersome, and might involve user devices engaging in many wasteful interactions with the interaction validation computer S to verify the expiry status.

A second technical solution to this technical problem includes the state attestation computer T notifying the user devices when an interaction is expired. When an interaction expires, the interaction validation computer S can forward the expired interaction to the state attestation computer T. The state attestation computer T can then determine the interaction initiator and inform the interaction initiator of the expired interaction. To do so, embodiments can provide for a more sophisticated interaction initiator token. In particular, the interaction initiator token can be a token which can be de-anonymized by the state attestation computer T, but not by the interaction validation computer S. For instance, in some embodiments, the interaction initiator token can be an encryption of the interaction initiator's identity using a state attestation computer T's cryptographic key. The interaction initiator token can be generated by the state attestation computer T during the state verification interaction between the interaction initiator the state attestation computer T, which is part of the interaction issuance method.

For the interaction initiator to also be able to prove ownership of their interaction initiator token, the state attestation computer T can disclose the randomness used for generating the interaction initiator token to the interaction initiator. In this way, the state attestation computer T can be able to inform the interaction initiator of expired interactions. Finally, an interaction initiator can reverse these expired interactions by engaging in a state update method with the interaction validation computer S and the state attestation computer T (which is similar to the interaction reception method as described herein) to complete the reversal of the expired interaction.

With regards to disputed interactions, much of the reversal process would remain the same. The difference is with regards to a condition that must be met in order to reverse the interaction. In the previous case, described above, the reversal condition was dependent on time (e.g., has the interaction expired or not). For disputed interactions, it can be assumed that there is an arbiter device that is recognized by the interaction validation computer S, whose verdict on a dispute can be presented by the user devices involved in the dispute to the interaction validation computer S. The interaction validation computer S would be able to verify that an authentic verdict has been presented (e.g., using signatures created by the arbiter device and verified with arbiter device public keys by the interaction validation computer) and then proceed with the reversal flow as described above.

VI. Compliance Checks

Some embodiments further provide for the ability to perform compliance checks into the system. Any compliance system operations can be performed within the system can may be processed through both the interaction validation computer S and the state attestation computer T. The identities of user devices are completely hidden from the interaction validation computer S, whereas the state attestation computer T has visibility over the verification keys of the user devices. This means that the state attestation computer T can perform velocity checks by maintaining a count of how many times user devices have communicated with the state attestation computer T.

Embodiments can also utilize specific tags to identify the nature of the operation being performed by the user devices during their communication with the state attestation computer T. This information can also be leveraged to perform more complicated velocity checks (e.g., limiting to no more than a thousand interactions made per minute and no more than seven hundred interactions received per minute, etc.).

A point to note here is that the state attestation computer T does have clear visibility over the verification keys of the users. One may ask if this is a fundamental limit of how little may be known by the state attestation computer T and the interaction validation computer S. The answer is, no. In some cases user devices can present commitment of their public keys rather than the public keys themselves to the state attestation computer T, thus hiding the user device public keys from the state attestation computer T and yet interact with the state attestation computer T as before.

However, notice that this still would not provide complete anonymity. For example, the state attestation computer T will be able to link various interactions of the same user device. And this appears to be a fundamental limit of how little may be known by the state attestation computer T and the interaction validation computer S. If the state attestation computer T is to authorize the most recent state of a user device, the state attestation computer T must be able to tell user devices apart and link various interactions of user devices together in this manner. While this approach does not provide perfectly complete anonymity, it does help user devices from having to disclose their identities from outside of the system. However, by doing so, if neither the interaction validation computer S nor the state attestation computer T can ascertain anything about the user devices within the system there may be some downsides such as duplicate identities, inability to blacklist, etc. A solution to this problem, according to some embodiments, can be to couple the system 100 illustrated in FIG. 1 with an identity token system that can help guarantee the nature of user devices within the system. Such an approach would work well to integrate some form of user checks into the system as well. This functionality could be a separate entity within the system (e.g., an identity verification computer), or a part of the state attestation computer T.

Furthermore, when implementing compliance checks, notice that user devices have to prove that they have sufficient funds for interactions while interacting with the interaction validation computer S. This can be extended having the interaction validation computer S also perform volume checks, where user devices would now additionally have to prove to the interaction validation computer S that the interaction amounts associated with the interactions are not too high (e.g., over an amount threshold limit).

In some embodiments, more complicated volume checks can be performed. For example, a more complicated volume check can include limiting a user device to not more a million dollars in interaction amounts within a day. For instance, the state attestation computer T could store some appropriately chosen older states of user devices in addition to their current states. Further, by requiring proofs involving not just the most recent state but older states as well, the interaction validation computer S can perform more complicated volume checks. Note that such checks could be performed by the state attestation computer T as well, but for the sake of compartmentalization, within the scope of various embodiments, the interaction validation computer S can deal with volume checks while the state attestation computer T can deal with velocity checks.

VII. Additional Embodiments

Further embodiments can involve performing other compliance checks and also supporting audits of some form. For example, it can be envisioned that auditors could access and read, in the clear, some of the explicit or implicit information described methods above. User devices could also prove to auditors in zero-knowledge the nature of their interactions while still retaining some privacy and/or anonymity. Much of the situations here revolve around the trade-offs regarding how much privacy and anonymity the system according to embodiments must offer and what compliance checks and audits are supported. Designs around many such boundaries can be possible by using and/or extending the techniques presented herein as well as private auditability and secure machine learning techniques.

Embodiments of the disclosure have a number of advantages. For example, embodiments provide for the advantage of allowing a first user device to not disclose the first user device's identity, a second user device's identity, an amount to be provided from the first user device, or the account balance maintained by the first user device. As such the first user device can perform anonymous interactions with a second device that are still authorized by a central system (e.g., including the interaction validation computer and the state attestation computer).

As an example, in a standard debit transactions framework, users are registered with a central server, which tracks the list of users along with their cash balances. Users would submit transactions (that move funds from one user to another) to the central server which would validate the identities of the parties involved, that the payer has enough funds, and then finally move the funds.

In contrast, embodiments provide for a system in which users can maintain their own account balances and can anonymously submit interactions to an interaction validation computer. The interaction validation computer can validate that the interaction initiator has a sufficient account balance and can move the amount without knowing or learning any account balances, the amounts moved or the identities of the parties involved in the interaction. The anonymity provided by embodiments is advantageous because anonymity provides identity protection to both the user and the user device.

Furthermore, current methods are vulnerable to data breaches, since all of the user identification and balance information is stored by the central server. During a data breach, all of this data can be made readily available by a malicious party. Embodiments provide for advantages over such current methods. For example, embodiments provide for the advantage of limiting the impact of a data breach. The impact of a data breach is limit because the interaction validation server and the state attestation computer do not store account balances or interaction amounts. Further, the interaction validation server does not store user device identifiers.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
generating, by a user device, an initiate interaction request message comprising a state commitment;
providing, by the user device, the initiate interaction request message to a first server computer, wherein the first server computer creates a verify state request message comprising an interaction index, an interaction index commitment, and a first commitment signature formed from the state commitment and the interaction index commitment;
receiving, by the user device, the verify state request message from the first server computer;
generating, by the user device, a modified verify state request message comprising a user device public key, the state commitment, the interaction index commitment, and the first commitment signature;
providing, by the user device, the modified verify state request message to a second server computer, wherein the second server computer verifies the state commitment, verifies the first commitment signature, and creates a second commitment signature formed from the state commitment and the interaction index commitment;
receiving, by the user device, a verify state response message comprising the second commitment signature from the second server computer, wherein the method comprises
generating, by the user device, an amount commitment based on an amount maintained by the user device;
generating, by the user device, a new partial state based on the user device public key, a new serial number, a new first random value, a new second random value, and a new balance amount;
generating, by the user device, a new identifier commitment based on the user device public key and the new serial number;
generating, by the user device, a balance commitment based on the new balance amount;
generating, by the user device, a zero-knowledge proof using at least the interaction index, the state commitment, the amount commitment, the new identifier commitment, and the balance commitment;
generating, by the user device, an interaction request message comprising the interaction index, the state commitment, the amount commitment, the new identifier commitment, the balance commitment, the second commitment signature, and the zero-knowledge proof;
providing, by the user device, the interaction request message to the first server computer, wherein the first server computer evaluates elements of the interaction request message and generates an interaction completed message, based on the evaluation, comprising a third commitment signature formed from the interaction index and the amount commitment, a fourth commitment signature formed from the new identifier commitment and the balance commitment, and a fifth commitment signature formed from the state commitment and the fourth commitment signature; and
receiving, by the user device, the interaction completed message from the first server computer.

2. The method of claim 1, wherein an interaction associated with the initiate interaction request message is a payment transaction and wherein the amount is an amount of money.

3. The method of claim 1 further comprising:
after receiving the interaction completed message, generating, by the user device, a state update request message comprising the user device public key, the fourth commitment signature, and the fifth commitment signature; and
providing, by the user device, the state update request message to the second server computer, wherein the second server computer verifies the fourth commitment signature and the fifth commitment signature, and stores the fourth commitment signature.

4. The method of claim 1 further comprising:
generating, by the user device, an interaction submitted notification message comprising the interaction index, the amount, and the third commitment signature; and
providing, by the user device, the interaction submitted notification message to a receiving device.

5. The method of claim 1, wherein generating the new partial state further comprises:
obtaining, by the user device, a current state comprising a serial number, the user device public key, a balance amount, a first random value, a second random value, and a state signature;
generating, by the user device, the new serial number by incrementing the serial number of the current state by a predetermined amount;
determining, by the user device, the new first random value and the new second random value; and
determining, by the user device, the new balance amount based on the balance amount and the amount.

6. The method of claim 1, wherein the user device is a second user device, wherein the method is an interaction reception method that further comprises:
prior to generating the initiate interaction request message, receiving, by the user device, an interaction submitted notification message from a first user device, wherein the interaction submitted notification message comprises the interaction index, the amount, and the third commitment signature.

7. The method of claim 6, wherein the first server computer is an interaction validation computer and the second server computer is a state attestation computer, and the user device is a mobile phone.

8. The method of claim 1, wherein the first server computer is an interaction validation computer and the second server computer is a state attestation computer.

9. The method of claim 1 further comprising:
generating, by the user device, the state commitment using a state signature and a random value chosen from a first random value and a second random value.

10. The method of claim 9, wherein the first random value, the second random value, and the state signature are included in a state stored by the user device.

11. The method of claim 1, wherein the modified verify state request message comprises a random value, wherein the second server computer verifies the state commitment using the random value, the state commitment, and a previously stored state signature that was stored during enrollment or a previous interaction.

12. The method of claim 1, wherein generating the amount commitment further comprises:
obtaining, by the user device, a third random value; and
generating, by the user device, the amount commitment based on the third random value and the amount using a Pedersen commitment process with two random public generators.

13. The method of claim 1, wherein the user device is a first user device, wherein after receiving the interaction completed message from the first server computer, the method further comprises:
generating, by the first user device, an interaction submitted notification message comprising the interaction index, the amount, and the third commitment signature; and
providing, by the first user device, the interaction submitted notification message to a second user device, wherein an interaction of the interaction request message is the interaction to transfer the amount from a first account associated with the first user device to a second account associated with the second user device.

14. A user device comprising:
a processor; and
a computer-readable medium coupled to the processor, the computer-readable medium comprising code executable by the processor for implementing a method comprising:
enrolling the user device in an interaction processing system comprising a first server computer and a second server computer, wherein enrolling in the interaction processing system further comprises:
generating an identifier commitment based on a user device public key, a serial number, and a first random value;
generating a balance commitment based on a balance amount and a second random value;
generating an enrollment proof based on the identifier commitment, the balance commitment, the user device public key, the balance amount, the first random value, and the second random value;
generating an enrollment request message comprising the identifier commitment, the balance commitment, and the enrollment proof;
providing the enrollment request message to the first server computer, wherein the first server computer verifies the enrollment proof, and if the enrollment proof is valid, the first server computer generates an enrollment response message comprising a state signature created by signing a combination of the identifier commitment and the balance commitment using a first server computer private key;
receiving the enrollment response message from the first server computer;
generating an enrollment indication message comprising the user device public key, the balance commitment, the first random value, and the state signature; and
providing the enrollment indication message to the second server computer, wherein the second server computer verifies whether or not the user device is already enrolled, verifies the state signature, and stores the state signature in association with the user device public key in a state map;
generating an initiate interaction request message comprising a state commitment;
providing the initiate interaction request message to the first server computer, wherein the first server computer creates an verify state request message comprising an interaction index, an interaction index commitment, and a first commitment signature formed from the state commitment and the interaction index commitment;
receiving the verify state request message from the first server computer;
generating a modified verify state request message comprising the user device public key, the state commitment, the interaction index commitment, and the first commitment signature;
providing the modified verify state request message to the second server computer, wherein the second server computer verifies the state commitment, verifies the first commitment signature, and creates a second commitment signature formed from the state commitment and the interaction index commitment; and
receiving a verify state response message comprising the second commitment signature from the second server computer.

15. The user device of claim 14, wherein the user device is a mobile phone.

16. The user device of claim 14, wherein the state map maps user device states to user device public keys.

17. A user device comprising:
a processor; and
a computer-readable medium coupled to the processor, the computer-readable medium comprising code executable by the processor for implementing a method comprising:
generating an initiate interaction request message comprising a state commitment;
providing the initiate interaction request message to a first server computer, wherein the first server computer creates an verify state request message comprising an interaction index, an interaction index commitment, and a first commitment signature formed from the state commitment and the interaction index commitment;
receiving the verify state request message from the first server computer;

generating a modified verify state request message comprising a user device public key, the state commitment, the interaction index commitment, and the first commitment signature;

providing the modified verify state request message to a second server computer, wherein the second server computer verifies the state commitment, verifies the first commitment signature, and creates a second commitment signature formed from the state commitment and the interaction index commitment;

receiving a verify state response message comprising the second commitment signature from the second server computer;

generating an amount commitment based on an amount maintained by the user device;

generating a new partial state based on the user device public key, a new serial number, a first random value, a second random value, and a new balance amount;

generating a new identifier commitment based on the user device public key and the new serial number;

generating a balance commitment based on the new balance amount;

generating a zero-knowledge proof using at least the interaction index, the state commitment, the amount commitment, the new identifier commitment, and the balance commitment;

generating an interaction request message comprising the interaction index, the state commitment, the amount commitment, the new identifier commitment, the balance commitment, the second commitment signature, and the zero-knowledge proof;

providing to the first server computer, the interaction request message wherein the first server computer evaluates elements of the interaction request message and generates an interaction completed message, based on the evaluation, comprising a third commitment signature formed from the interaction index and the amount commitment, a fourth commitment signature formed from the new identifier commitment and the balance commitment, and a fifth commitment signature formed from the state commitment and the fourth commitment signature; and receiving the interaction completed message from the first server computer.

18. The user device of claim 17, wherein the user device is a first user device, and wherein the interaction request message is for an interaction for an interaction amount between the first user device and a second user device.

19. A method comprising:

receiving, by a first server computer, an initiate interaction request message from a user device, wherein the initiate interaction request message comprises a state commitment, which requests an interaction be processed;

determining, by the first server computer, an interaction index for the interaction;

generating, by the first server computer, an interaction index commitment based on the interaction index and a random value;

generating, by the first server computer, a first commitment signature by signing a combination of the interaction index commitment and the state commitment using a first server computer private key;

creating, by the first server computer, a verify state request comprising the interaction index, the random value, the interaction index commitment, and the first commitment signature;

providing, by the first server computer, the verify state request to the user device, wherein the user device obtains a second commitment signature from a second server computer, and wherein the method further comprises receiving, by the first server computer, an interaction request message comprising the interaction index, the random value, the state commitment, an amount commitment, a new identifier commitment, a new balance commitment, the second commitment signature, and a zero-knowledge proof;

verifying, by the first server computer, the second commitment signature using a second server computer public key:

verifying, by the first server computer, the zero-knowledge proof;

if the second commitment signature and the zero-knowledge proof are valid, generating, by the first server computer, a third commitment signature by signing a combination of the interaction index and the amount commitment using the first server computer private key;

generating, by the first server computer, a fourth commitment signature by signing a combination of the new identifier commitment and the new balance commitment using the first server computer private key:

generating, by the first server computer, a fifth commitment signature by signing a combination of the state commitment and the fourth commitment signature using the first server computer private key;

creating, by the first server computer, an interaction completed message comprising the third commitment signature, the fourth commitment signature, and the fifth commitment signature; and providing, by the first server computer, the interaction completed message to the user device.

20. The method of claim 19, wherein the first server computer is an interaction validation computer and wherein the interaction is an interaction to transfer an amount from a first balance maintained by the user device to a second balance maintained by a second user device.

* * * * *